(12) United States Patent
Pasternak et al.

(10) Patent No.: US 7,505,531 B1
(45) Date of Patent: Mar. 17, 2009

(54) SIGNAL COMMUNICATIONS SYSTEM AND METHOD FOR NOISY LINKS

(75) Inventors: Eliezer Pasternak, Palo Alto, CA (US); Ladd El Wardani, La Jolla, CA (US)

(73) Assignee: Bridgewave Communications, Inc., Santa Clara, CA (US)

( * ) Notice: Subject to any disclaimer, the term of this patent is extended or adjusted under 35 U.S.C. 154(b) by 0 days.

(21) Appl. No.: 09/528,111

(22) Filed: Mar. 17, 2000

(51) Int. Cl.
*H04K 1/02* (2006.01)
*H04L 25/03* (2006.01)
*H04L 25/49* (2006.01)

(52) U.S. Cl. .................. 375/298; 375/261; 332/103
(58) Field of Classification Search .......... 375/261, 375/298, 295, 316; 329/304, 363; 332/103, 332/144, 149; 370/207, 206, 527, 536
See application file for complete search history.

(56) References Cited

U.S. PATENT DOCUMENTS

| 5,010,405 | A | 4/1991 | Schreiber et al. |
|---|---|---|---|
| 5,274,449 | A | 12/1993 | Keesen |
| 5,387,939 | A | 2/1995 | Naimpally |
| 5,436,930 | A | 7/1995 | Bremer et al. |
| 5,440,585 | A | 8/1995 | Partridge, III |
| 5,448,555 | A | 9/1995 | Bremer et al. |
| 5,537,436 | A | 7/1996 | Bottoms et al. |
| 5,537,441 | A | 7/1996 | Bremer et al. |
| 5,844,944 | A | 12/1998 | Betts et al. |
| 5,859,877 | A | 1/1999 | Betts et al. |
| 5,881,047 | A | 3/1999 | Bremer et al. |
| 5,956,373 | A | * | 9/1999 | Goldston et al. ........... 375/298 |
| 6,005,894 | A | * | 12/1999 | Kumar ..................... 375/270 |

OTHER PUBLICATIONS

W. F. Schreiber, *A Compatible High-Definition Television System Using the Noise-Margin Method of Hiding Enhancement Information*, SMPTE Journal, Dec. 1989, vol. 98, No. 12, pp. 873-879.

* cited by examiner

*Primary Examiner*—Jean B. Corrielus
(74) *Attorney, Agent, or Firm*—Gray Cary Ware & Freidenrich LLP

(57) ABSTRACT

A system and method for communicating signals over a noisy channel is provided wherein an input signal may be sampled and modulated to make the signal more noise insensitive. In accordance with one embodiment, of the invention, an signal code modulation (SCM) scheme may be used wherein digital and analog signals representing the original signal are generated. In another embodiment, an original modulated signal may be demodulated and then remodulated using a more robust modulation scheme. The system may be used to a variety of applications including wireless internet access.

10 Claims, 13 Drawing Sheets

SIGNAL COMMUNICATIONS SYSTEM AND METHOD FOR NOISY LINKS

BACKGROUND OF THE INVENTION

This invention relates generally to communication systems including modulation techniques and in particular to a system and method for communicating a signal over a noisy communications link/channel. In more detail, the invention relates to the transparent communication of analog and digital signals over noisy channels. The system and method may be used for communicating various types of data over various different communication channels. For example, the system may be used to provide fast Internet access over wireless links.

As the demand for high-speed Internet access grows, the existing solutions fall short of expectations in many situations. One access solution that has become popular are cable modems. The cable TV infrastructure is used for providing Internet access by allocating one or more channels of the cable for that purpose. The internet access channel is then a shared medium used by multiple subscribers. Each subscriber has a cable modem that communicates with the cable facility head-end via the cable channel and a specially allocated return channel, usually in the same cable. Several protocols have been devised for controlling the access over this shared medium, including the DOCSIS protocol that is gaining popularity in the USA. Cable modems are becoming mass-market commodities with low unit prices and compatibility with head-end cable modem termination systems (CMTS) of multiple vendors. Another high-speed Internet access option is a family of digital subscriber line (DSL) modems operating over telephone line twisted pairs. DSL is quickly becoming a low-cost access method. Yet another option is fiber optics that allows very high speed access.

All of the above current access methods, however, have significant drawbacks. For example, fiber optics, which is the fastest access technology, is too expensive to reach each home or office and is therefore unavailable for many people. The cable infrastructure is not available in commercial areas and some cable installations are not equipped with a return channel. Finally, DSL has a limited range and speed and as the access bit rates required increase, the DSL range is further reduced.

An alternative to the above methods is fixed wireless access. Wireless access can take the form of point to point, point to multipoint or multipoint to multipoint communications. By using directional antennas and millimeter wave frequency bands where commercially licensed spectrum is more abundant than at lower frequencies, it is possible to provide broadband access services to a large number of subscribers over line of sight wireless links. These wireless links, despite their own limitations of a line of sight, rain fading and high-cost, are the preferred choice where fiber, cable or DSL links cannot provide the desired cost/performance objectives.

As wireless access products emerge, their economic limitations are becoming more apparent. One such limitation is the cost of the infrastructure. In particular, to deploy a complete access network, the infrastructure must include base stations, switching equipment and backbone links. The wireless network is not necessarily more expensive than a cable-based network, however, the up-front investment in such a network is a major burden to the service providers. Another limitation is the cost of the subscriber's equipment. This equipment is expensive partially due to the millimeter wave components and partially due to the relatively low-volume production of the equipment. Finally, as the wireless access standards evolve, a variety of protocols and equipment types are being introduced that cause a fragmented market and limits the mass market cost-reduction opportunities for any one piece of equipment so that the equipment costs remain high.

To overcome such cost limitations, it is desirable to provide wireless solutions that take advantage of the existing infrastructure available for cable or DSL modem, thus reducing the up front capital investment required for installing wireless access services. If properly implemented, such solutions could share the same cable facilities and hub equipment that is already installed and provide land-based services. Furthermore, it is desirable to be able to use existing cable and DSL modems as the subscriber interfaces for a wireless access system, thus taking advantage of these low-cost mass-market products. It is also desired to accommodate a variety of evolving subscriber equipment in a wireless network with minimal changes to the wireless equipment.

Such desired flexibility requires a transparent wireless link that allows the transmission of any band-limited signal. This equipment could operate as a wireless repeater, which is essentially an up converter to the microwave frequency at the transmitter, and a down converter at the receiver. While this approach is used at low frequencies, it is not sufficient in most wireless applications. As an example, cable modem modulation is typically 256QAM (256 quadrature amplitude modulation) or 64QAM. However, most wireless links only tolerate effectively more robust modulation schemes, such as 16QAM and 4QAM, as those links produce too much interference and phase noise to tolerate higher modulation levels. If the cable modem or DSL equipment should remain unchanged, the wireless repeater must convert the high-modulation of the subscriber equipment to a lower modulation mode. Such conversion is feasible but has several limitations. The demodulation requires decoding of the forward error correction (FEC) overhead to overcome any errors in the cable section from the CMTS to the wireless equipment. This decoding causes a significant delay if interleaving is used. Finally, such scheme is not transparent and changes to protocol require different demodulation-remodulation equipment. It is therefore desirable to be able to pass such modulation transparently to the subscriber equipment modulation scheme and yet obtain the robustness for the wireless link. These seemingly contradicting requirements are feasible in principle if the wireless link is trading off bandwidth for robustness so that it is acceptable to sacrifice reasonable amount of bandwidth to obtain the robustness. It is highly desirable that the excess bandwidth will not be essentially higher than Shannon bound for channel capacity as is well known from Information Theory.

A general approach for maintaining transparency is to treat the cable or DSL modem output as band-limited analog information. In particular, although the modem transmission carries digital information, its quadrature amplitude modulated (QAM) output does resemble band-limited Gaussian noise. If the radio link is modeled as a white Gaussian channel, there are several well-known approaches to transmit those modem signals over that radio link. One such technique is analog modulation. If the radio link bandwidth is increased, the output signal to noise ratio (SNR) can also increase. For example, a modem signal using 256QAM modulation could use a frequency modulated (FM) link with sufficient bandwidth expansion such that a radio link SNR of 20 dB will result in an output SNR of 40 dB in the FM link output that is sufficient for 256QAM. The analog modulation approach has a major drawback in the form of a threshold effect that reduces output SNR significantly at lower link SNR so that the overall radio link margin is much lower than a digital link of the same bandwidth and throughput.

A digital alternative to transmit the modem signal over a noisy link also exists. It is based on the well-known pulse code modulation (PCM) technique. The modem output, treated as an analog channel, is sampled, converted to digital, compressed using source-coding techniques and transmitted over a channel using a combination of QAM and FEC. It is also well known that if the source is a band limited gaussian process, then it is possible with proper compression and error-coding technique to closely approximate the channel capacity bound based on Shannon's theory. PCM, however, has a key drawback for the transparent modem transmission application considered here. In particular, to make efficient use of bandwidth, the PCM encoder distorts the signal to provide the lowest acceptable level of SNR_in for the payload information. This means that a compressed link will always perform at that level of distortion, even when the actual link SNR is well above threshold conditions. Alternatively, one can allow lower distortion, which is better for the modem link, but requires higher link system gain. It is highly desirable to maintain the simplicity of an analog bandwidth expansion channel and the coding efficiency of a digital link, to allow bandwidth efficiency and allow operation with increasing performance margins when the link SNR is above minimum, without increasing the system gain requirements. It is to this end that the invention is directed as described below in more detail. However, the system and method for combining an analog signal and a digital signal in accordance with the invention may also be used for other communications links. In addition, the system and method in accordance with the invention may also be used for other signal recording, such as recording data onto a compact disk or other media, and signal processing applications.

SUMMARY OF THE INVENTION

A combined analog-digital modulation scheme in accordance with this invention, known as Signal Code Modulation ("SCM"), provides the transparency of analog modulation and the link error-resistance of a digital link. The SCM technique is described below in conjunction with a radio link, although it is suitable for transmission over any communication channel or channels where analog and digital communications are possible. In an SCM modulator in accordance with the invention, the input band-limited analog signal may be a true analog process, such as a television channel, but may also be the output of a digitally modulated signal, such as a cable modem output. This input analog signal may be converted to a baseband frequency by a conventional receiver front-end and may be filtered and sampled at a sampling rate suitable for the signal bandwidth.

These time-discrete signals (samples) may then be aggregated into a group of M symbols, where M is an integer greater than or equal to 1. This aggregate of M samples represents a vector point in an M-dimensional signal space. A stretching transformation may be performed on this space. This stretching can be as simple as a linear expansion of the input signal space or an arbitrary transformation defined by a lookup table. The stretching operation increases the input signal's dynamic range. Each input vector point is transformed to a corresponding output vector point. To limit the radio channel dynamic range, the signal space is sliced onto K subspaces. The subspace containing the output vector point may be chosen as an analog symbol, denoted as an "A" symbol hereinafter. The indication of which subspace was chosen may be encoded digitally as "D" symbols. The "D" symbols are FEC encoded before transmission over the repeater link. The operations of stretching and slicing in accordance with the invention may be done in any order and the combined stretching and slicing operation is called "SCM mapping". The "A" and "D" symbols may then be modulated for a communications link, such as the radio link, and can be transmitted in separate channels or combined. A preferred modulation technique in accordance with the invention is to use modified QAM in which alternated pairs of "A" symbols, each representing two analog SCM Mapper output values, are combined to a single analog QAM symbol, and FEC-encoded D symbols including other overhead, are modulated using digital QAM which are time-multiplexed with the "A" symbols.

An alternative embodiment for providing mixed analog and digital signals in accordance with the invention is a repeater structure which first demodulates the digital signals using a demodulation-remodulation scheme. Such as scheme may be preferred, at the expense of losing transparency, if SCM circuitry is not available, but conventional QAM modem and FEC components are available. In accordance with this embodiment of the invention, the cable modem concatenated code is first QAM demodulated to expose the digital content. A soft-decision trellis decoder decodes the trellis code and produces an error-corrected digital output. This output is then re-modulated using a trellis code which is optimized for the wireless-link, but may even be identical to the original trellis code. The combined digital bit stream is then modulated with modulation levels suitable for the wireless link. For example, the cable modem may use 256QAM, while the radio link may use 4QAM or 16QAM. The wireless link receive side is a QAM receiver that demodulates the radio link QAM, corrects errors of the trellis code and adds trellis encoding for the cable link. A cable modem at the receive-side receives a cable-compatible signal including a fully concatenated code.

In SCM and the demodulation-remodulation schemes in accordance with the invention, a framing overhead is added to simplify symbol synchronization as described in more detail below. A complete wireless repeater that reproduces cable modem or DSL signals is possible, in accordance with this Invention, by using radio transceivers with SCM or demodulation-remodulation modems instead of typical QAM modems. This Invention is further described below by drawing and detailed description.

DETAILED DESCRIPTION OF THE PREFERRED EMBODIMENTS OF THE INVENTION

The invention is particularly applicable to a system for communicating cable modem or DSL signals over a wireless radio link to provide fast internet access and it is in this context that the invention will be described. It will be appreciated, however, that the system and method in accordance with the invention has greater utility, such as to other types of communications links and channels that require a noise-sensitive signal to be communicated over a noisy communications link. Now, an example of the system implemented in a typical cable modem environment will be described.

Figure 1:
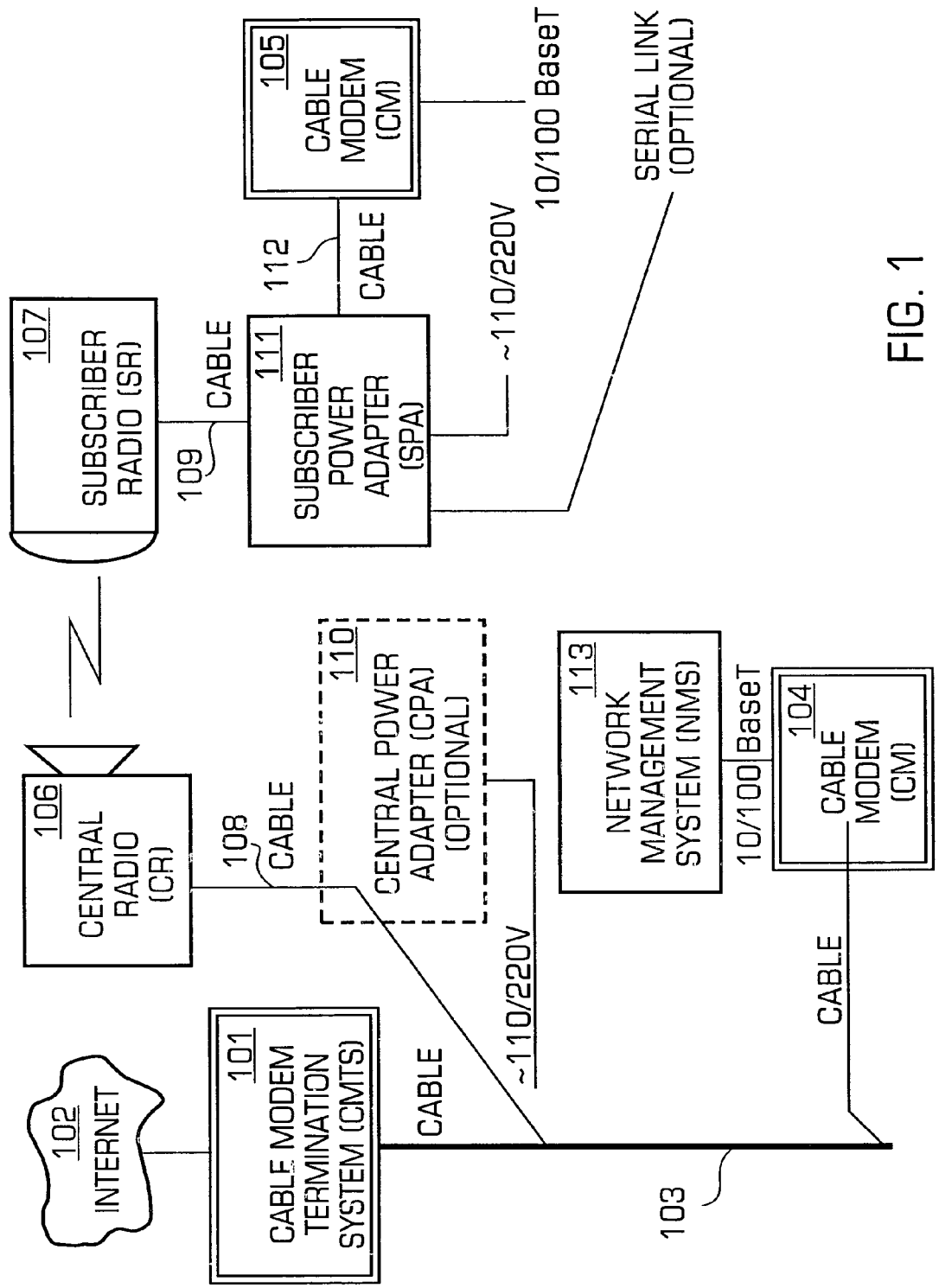
FIG. 1 shows the building blocks of a wireless system in accordance with the invention in a cable modem environment.

A wireless cable modem network in accordance with the invention is shown in FIG. 1. The conventional cable modem system over a cable or a hybrid fiber-cable (HFC), consists of a Cable Modem termination Systems (CMTS) 101 connected to a wide area network 102 such as a telephony system or the Internet. The cables or HFC are used as a distribution media 103 wherein date may occupy a channel that would otherwise be used for a cable TV channel. A cable modem 104 can be attached to the media 103 to provide two-way communications with the CMTS 101 assuming a cable system that has been modified for two-way communications. The downstream communications from the CMTS 101 to the cable modems 104 occupies a typical TV channel bandwidth (e.g., 6 MHz) and includes the transmission of IP packets and MAC-layer messages to the cable modems. The downstream transmission is usually a continuous wave with high modulation complexity using quadrature amplitude modulation (QAM), such as 64QAM and 256QAM. The upstream transmission from the cable modem to the CMTS usually occupies a narrower bandwidth than the downstream and it consists of bursts of 4QAM or 16QAM modulation signals. The upstream channel is placed in a lower frequency range, such as 5 MHz-42 MHz, while the downstream channels may be in the cable TV frequency range of 88 MHz to 860 MHz. The upstream channel is a shared medium, controlled by MAC layer commands from the CMTS in the downstream transmission. This MAC activity is specified by industry standards, such as MCNS-DOCSIS in North America and DAVIC in Europe.

With the wireless cable modem network in accordance with the invention, remotely placed cable modems 105 can communicate with the CMTS 101 via a Central Radio (CR) 106 and a Subscriber Radio (SR) 107. The CR 106 is connected to a cable branch 108 and the SR 107 reproduces the cable modem channel in a local cable segment 109. In accordance with the invention, the cable modem 105 believes that it is connected directly to the CMTS so that the wireless link (formed by the CR 106 and the SR 107) is transparent so that the cable modem 105 opreates normally. Thus, the transparency objective is met if the two separate cables 108 and 109 behave like a single long cable. In accordance with the invention, the cable 108, 109 may also be used optionally to send DC or AC power to the attached radio, using a power supply and associated DC block element to feed power to the radio while communicating the cable-modem signals. To accomplish this, a Central Power Adapter 110 is available for the central radio, and a Subcriber Power Adapter 111 for the SR. There is no DC power in the cable modem section of the cable 112, and due to the transparency to the NMAC layer, it is possible to connect multiple remote cable modems 105 to the same cable 112, using splitting and distribution techniques available for conventional cable modem installations.

The control and monitoring of the wireless network may be done via a network management system (NMS) 113 that is hosted on a computer system, such as a workstation, (the NMS may be one or more software applications being executed by the computer system in a preferred embodiment) and can access the radios 106, 107 using the cable modem 104 or a direct connection to the CMTS 101 (not shown). The CR is also accessed remotely via Internet protocols (TCP/IP) and SNMP. The control and management functions of the NMS are well known and will not be described herein.

Figure 2:
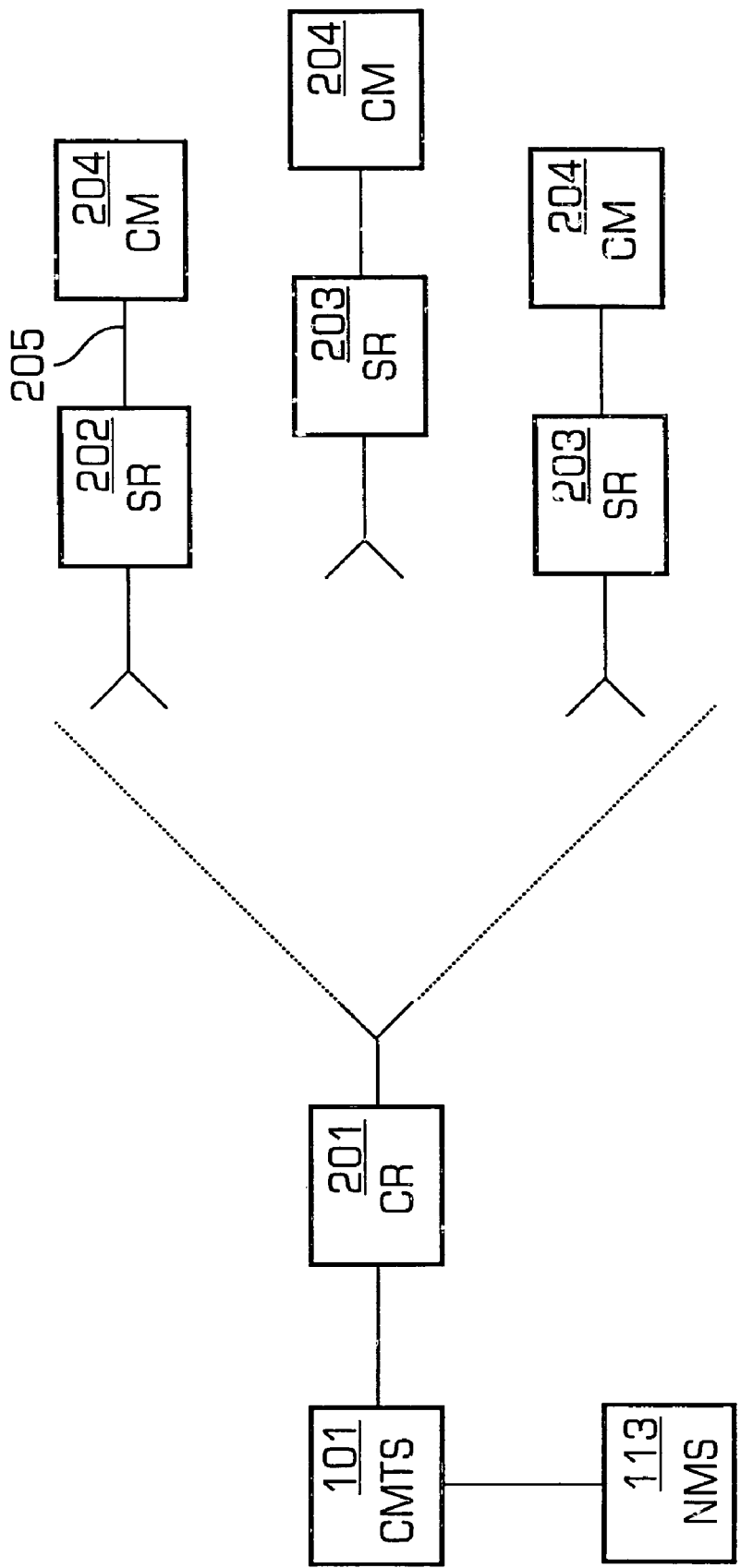
FIG. 2 shows a point to multipoint arrangement of a wireless cable modem system.

The reliance on a cable-based MAC layer allows the implementation of a point to multipoint network as shown in FIG. 2. A CR 201 is the hub of the network and multiple SRs 202, 203, each connected to one or more cable modems 204, are multipoint stations. Each SR 202, 203 transmits in the upstream direction to the CR 201 only when the attached cable modem 204 transm data upstream through a cable 205. This is accomplished by having the SR 202, 203 monitoring the transmissions in the cable 205 and up converting these transmissions to radio frequency bursts as needed.

Figure 3:
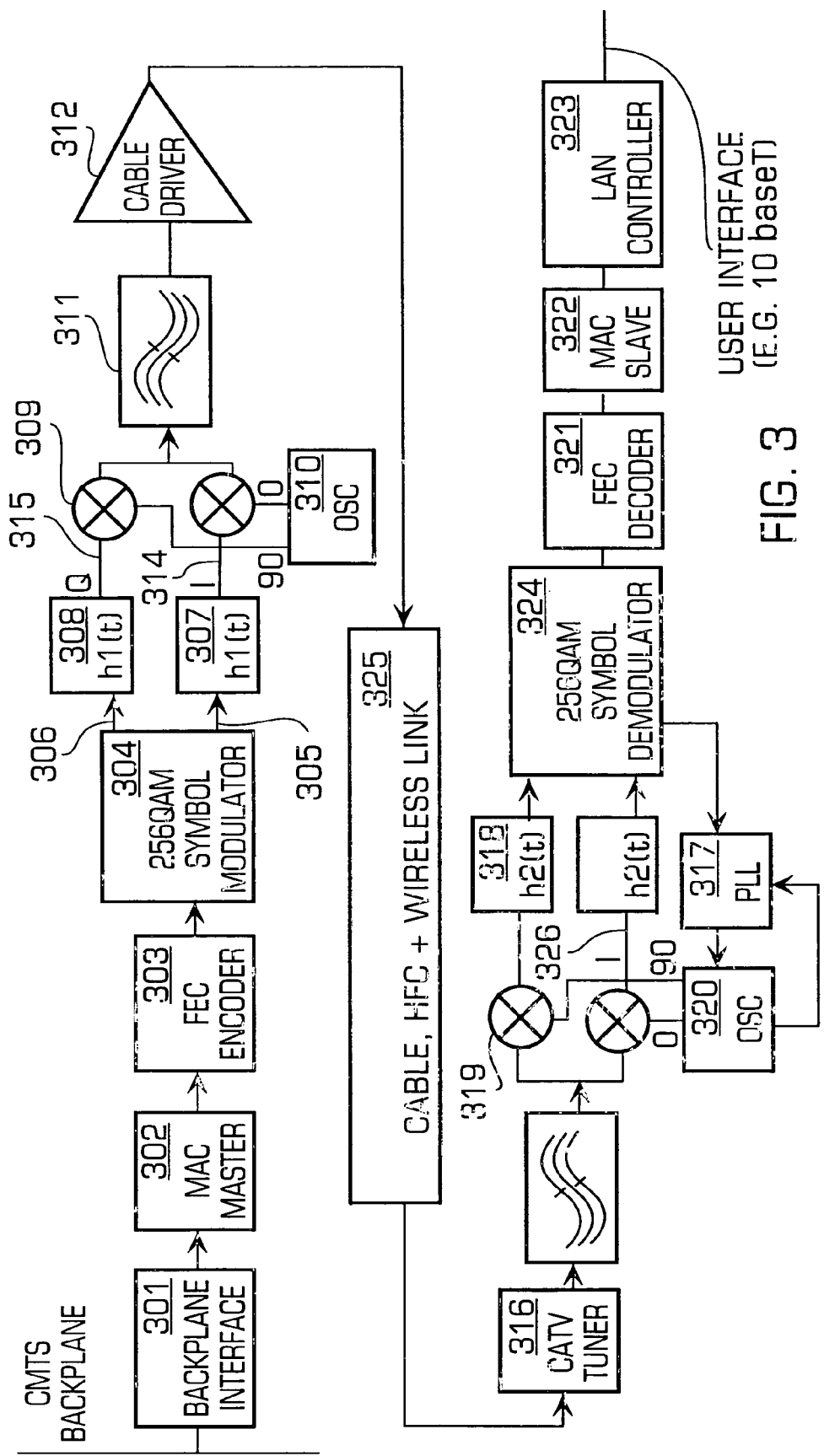
FIG. 3 shows the information flow in a downstream cable modem facility with a cable or wireless medium between head-end and subscribers.

To achieve a transparent communications link, the wireless network must take into account the nature of the signals generated by the cable modem network. FIG. 3 illustrates the data flow in a typical cable modem network. This figure only shows the downstream direction starting with the CMTS although the upstream direction is similar. A backplane interface card 301 receives digital information, such as Internet traffic and TDM telephony, from the CMTS backplane and passes this information to a MAC controller 302, which acts as the master of the two-way communication link. The MAC controller 302 interleaves MAC layer commands with the payload information as is well known. The combined data is processed by a forward error correction (FEC) encoder 303. A typical cable modem FEC code consists of a concatenated code including a convolutional code ("trellis code") a block code, such as Reed-Solomon and interleaving. The digital stream, including FEC, framing and scrambling, is delivered to a 256 QAM modulator 304. The modulated signals I 305 and Q 306, are passed through linear filters with impulse response h1(t) 307,308, and are then quadrature modulated 309 to the desired cable modem frequency set by an oscillator 310. Any unwanted signals are eliminated by a filter 311 and the clean signal drives the cable or HFC medium via a power amplifier 312. Most of these functions are typically performed by a digital signal processor (DSP). At some point during the above process, the digital flow is converted to analog. One optional point is at the filter outputs I 314 and Q 315. These filters are conveniently implemented as digital FIR structures and their outputs can be converted to analog, low-pass filtered and then drive an analog quadrature modulator 309.

The bottom half of FIG. 3 shows the cable modem downstream data flow. The cable modem receives the signal via a tuner 316, quadrature demodulator 319 and filters with impulse response h2(t) 318, such that the combined impulse response of h1(t) and h2(t), i.e. the convolution $h1(t)*h2(t)$ equals the desired link matched filter, usually the well known raised cosine response. Usually, $h1(t)=h2(t)$ and each filter is known as "root raised cosine filter". The cable modem processing chain includes quadrature demodulation 319, QAM demodulation 324, FEC decoding and deinterleaving 321, MAC slave side 322 and user interface 323 (such as 10baseT). The demodulation circuit includes a phase locked loop 317 that uses the quadrature demodulation oscillator 320. The wireless link 325 interrupts the cable connection with the CR and SR.

Figure 4:
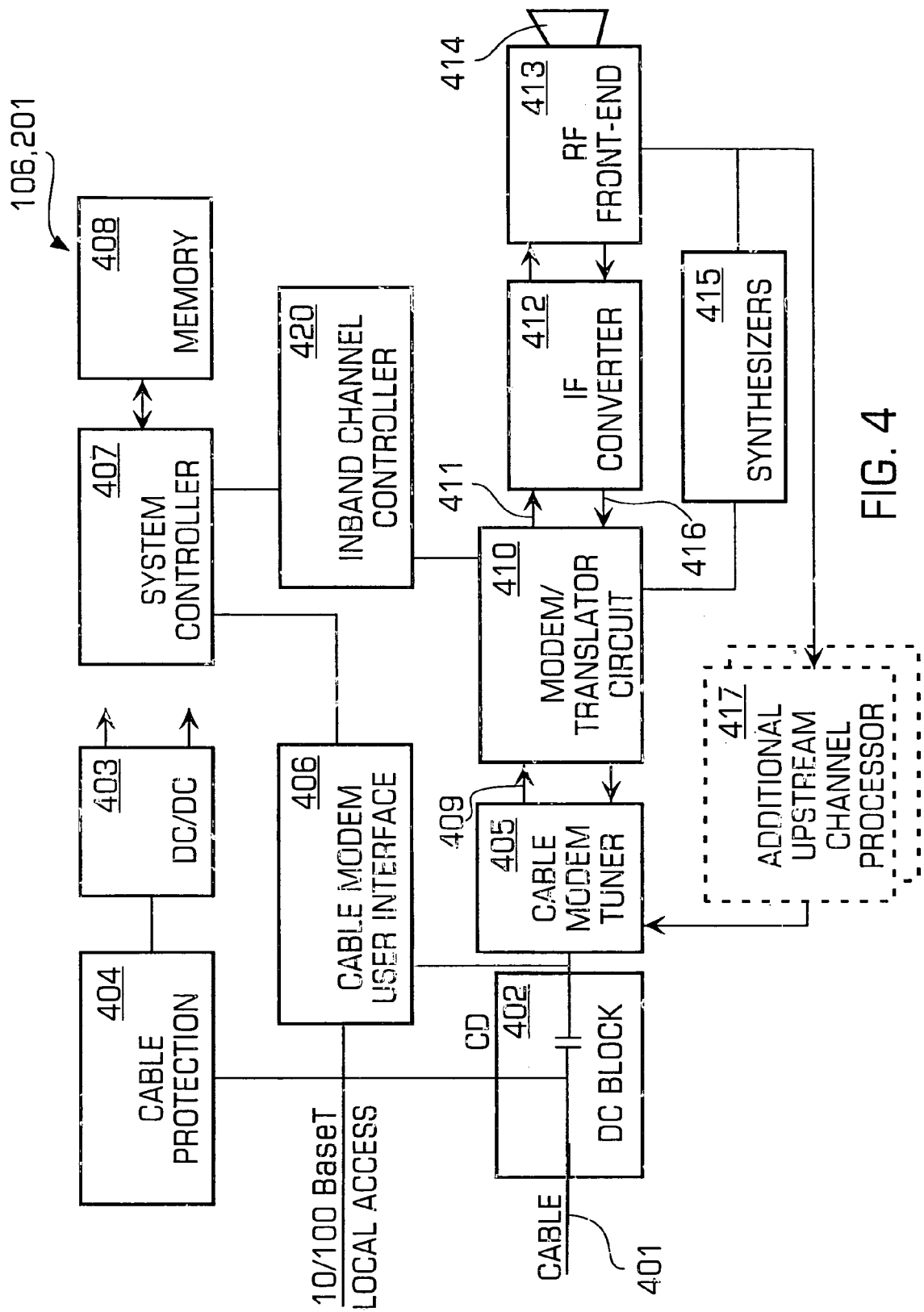
FIG. 4 is a block diagram illustrating more details of the central radio shown in FIG. 1.

A block diagram of a Central Radio is shown in FIG. 4. A cable connection 401 from the CMTS provides two way communication and, optionally, power to the radio as described above. The power is extracted via a DC port of a DC block 402. The power is delivered as DC or, optionally, AC and is converted to local voltages via a power supply 403. A cable protection circuit 404 provides indication that the CR is present so that power in the cable could be disabled as a safety precaution for cable handlers.

The other signal path out of the DC block 402 is to a cable modem tuner 405 and a cable modem board 406. The cable modem board 406 is used for remote management access of the CR via the cable infrastructure. This cable modem provides network access to a local system controller 407, which is a microprocessor board similar to a personal computer module, and including memory 408 for programs and data storage. The cable tuner 405 may include a receive section, similar to a cable modem tuner 316 shown in FIG. 3, and a transmitting tuner/cable driver, which is also similar to the driver found in existing cable modems for upstream transmission. The downstream data stream from the tuner 405 is a low frequency signal 409 that can be digitized and processed by a modem/translator circuit 410 that may perform special SCM modulation as described below and frequency shifts. The re-conditioned signal 411, suitable for a wireless link, may drive an up-converter 412 and a radio frequency (RF) front-end 413 and an antenna 414. The up-conversion and RF functions are similar to other radio products, and including mixers, power amplifiers and duplexers as required.

The central radio system may also include frequency setting functions using synthesizer functions 415. The upstream bursts arriving from SRs are received by the RF front-end 413, down converted by the IF circuit 412 and are delivered to the translation circuit 410 via an interface 416. As shown later, the translator functions 410 may be mostly digital. The signals 411 and 416 are either digital or analog, as it is a designer choice whether the lowest IF frequency processing is implemented digitally or by analog means. As a single downstream cable modem MC layer can control multiple upstream channels, additional upstream receivers 417 are included. The RF front 413 produces a received IF bandpass channel with enough bandwidth to include multiple upstream channels, each processed separately by a module 417, using circuitry similar to the translation circuit 410. While in the downstream direction a signal conversion is required in most applications when the Cable modem side transmits 256QAM or 64QAM, the upstream transmission may stay unchanged, because it includes radio tolerant modes of 4QAM or 16QAM. The upstream processing then is more conventional, including automatic gain control (AGC), Automatic Frequency Control (AFC) and frequency conversions.

The downstream transmission may contain control information from the CR to the SRs. This optional feature is called "Inband channel". The control information is generated by the system controller 407 and is transmitted in the downstream direction via a communication processor called "Inband Channel Controller" 420 which is a conventional communications processor such as an HDLC controller. This information is multiplexed with the payload data and using conventional digital framing techniques, the SR can separate this channel and process the information.

Figure 5:
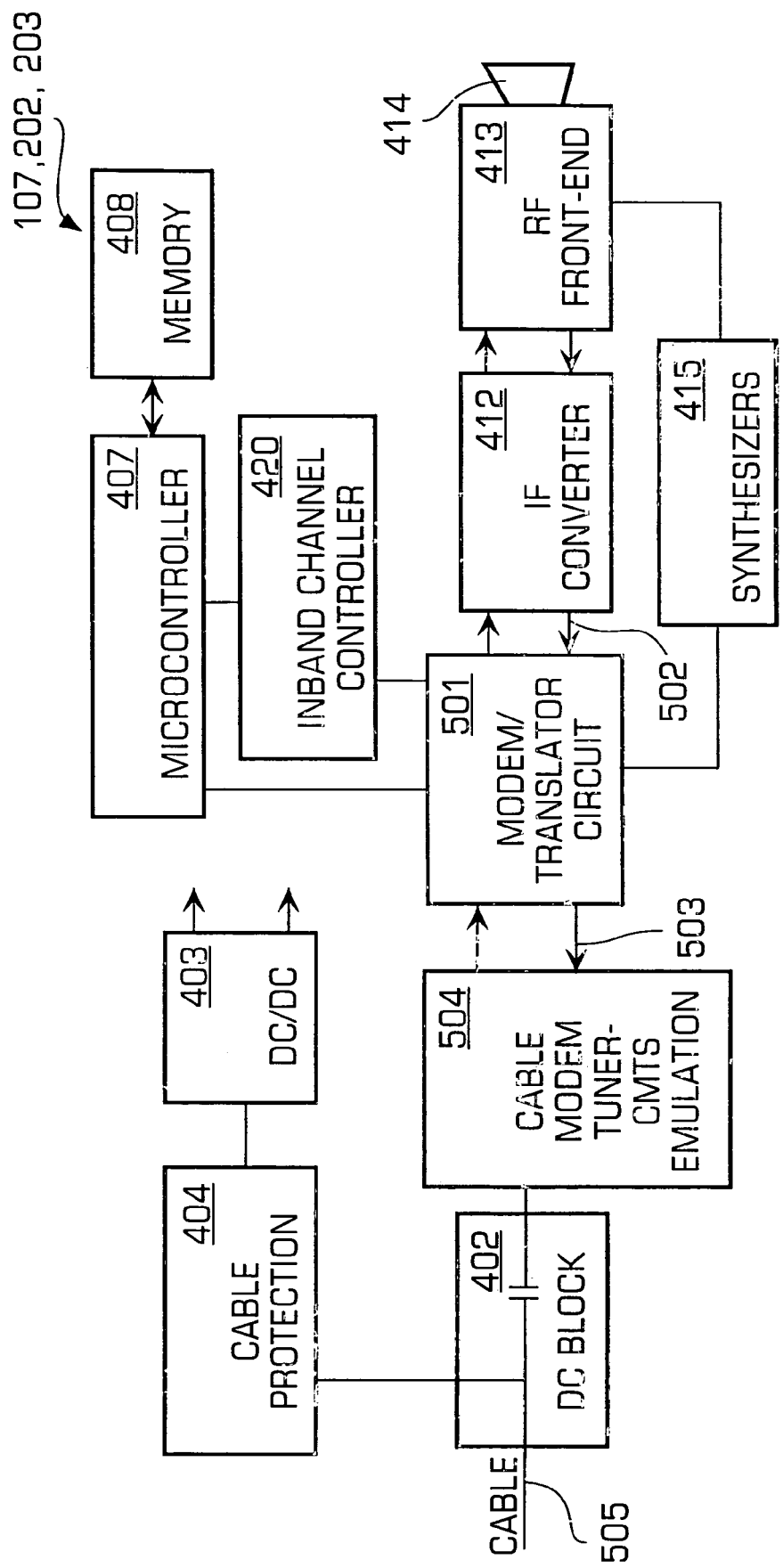
FIG. 5 is a block diagram illustrating more details of the subscriber radio shown in FIG. 1.

The block diagram of an example of a subscriber radio (SR) is depicted in FIG. 5. The functions of the SR are very similar to the CR so like reference numerals designate like elements and the functions of the similar elements will not be described here. However, there are several differences. The SR transmits at a different frequency than the CR, using frequency division duplexing (FDD). The SR transmit bursts in the radio link and receives continuous wave from the radio link. There is no cable modem embedded in the SR, because it is more economical to access the SR for network management purpose via the CR cable modem and the Inband Channel. Other duplexing methods can be used, such as time division duplexing (TDD), in which case both CR and SR may share the same RF frequency and the downstream transmission is also in burst mode. For transparency to the cable modem system, a translator circuit 501 converts the downstream signal 502 received from the CR to the cable modem format, such as 256QAM, and delivers this signal via signal bus 503 to a cable modem tuner 504. The cable modem tuner section operates in a CMTS mode, i.e. it transmits in one of the cable TV channels and receives from the cable modem bursts at the lower frequency band. For the cable modem, the cable 565 appears like a direct connection to the CMTS because the wireless link in accordance with the invention is transparent.

Figure 6:
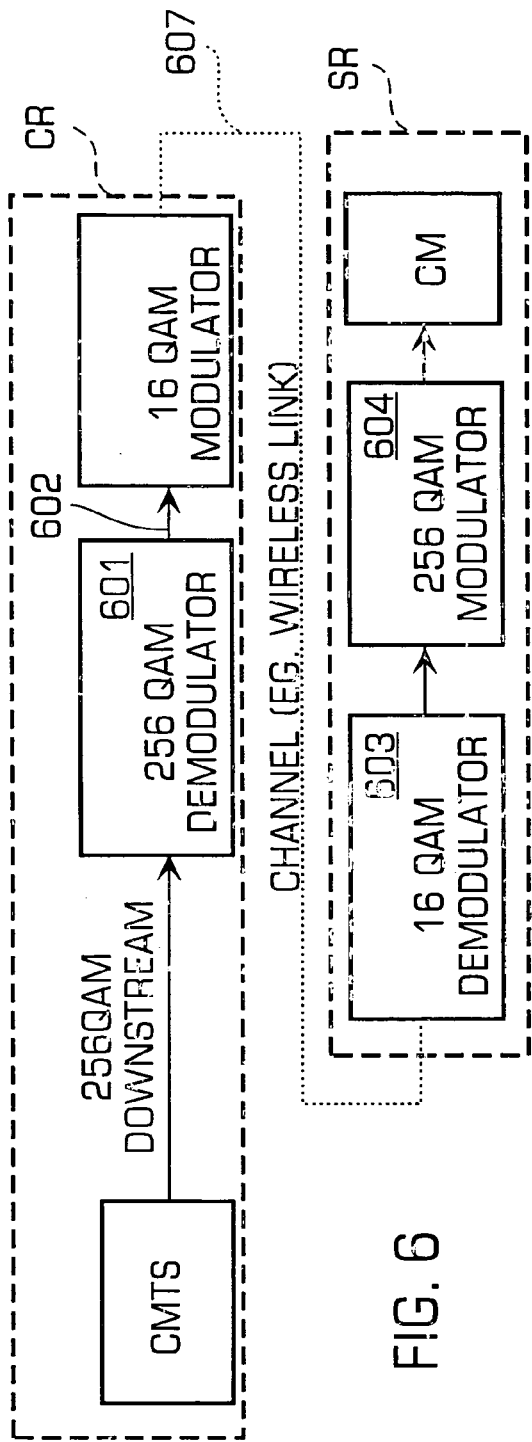
FIG. 6 shows a demodulation-remodulation ("demod-remod") scheme in accordance with a first embodiment of the invention for transmitting a noise-sensitive signal over a noisy channel.

The conversion from cable's 256QAM modulation to a more robust (e.g., more noise resistant) signal can be done in several ways. One possible approach in accordance with this Invention is modulation conversion, as shown in FIG. 6. In particular, FIG. 6 illustrates an example of a demodulation/remodulation system in accordance with the invention. The 256QAM signal from the CMTS is first demodulated using a 256QAM demodulator 601. Such devices are commercially available from the cable modem industry supplier such as Broadcom Corporation of Irvine, Calif. The recovered digital information 602 can be modulated for a noisy channel 607, such as a radio link, using more robust modulation such as 16QAM. The receiver side (SR) may demodulate the 16QAM signal using a demodulator 603 and then may modulate it again to 256QAM using a modulator 604. It is possible to perform such modulation translation without adding any overhead to the digital signal 602. However, the FEC of the "outer channel" between the CMTS and CM, as shown by blocks 303 and 321 in FIG. 3, are weakened by the hard decision of the demodulator 601. On the other hand, performing full FEC decoding and then encoding introduces significant delay, mainly due to the interleaving. A possible compromise may be performing trellis decoding only of the signal 602, and then re-encoding it, leaving the block code and interleaving untouched at this point. This mode of operation is called "Demod-remod". The occupied bandwidth in the radio channel is twice due to the conversion from 256QAM to 16QAM, as each 256QAM symbol requires two 16QAM symbols. This tradeoff is necessary in any communications channel that requires more robustness.

Figure 7:
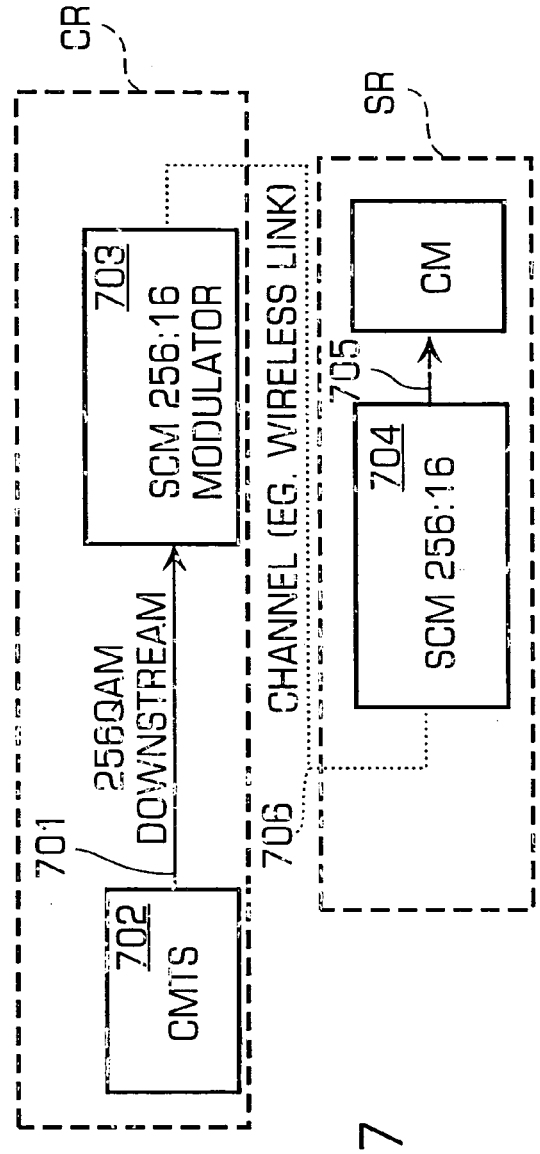
FIG. 7 shows a Signal Code Modulation (SCM) scheme in accordance with a second embodiment of the invention for scheme for transmitting a noise-sensitive signal over a noisy channel.

A more transparent approach to transmit a signal over a noisy channel in accordance with this Invention is signal code modulation (SCM). SCM performs a direct translation from 256QAM to a transmission as robust as 16QAM, using roughly twice the bandwidth (as demod-remod) but without demodulation of the 256QAM signal. An example of a SCM system in accordance with the invention is shown in FIG. 7. In particular, a 256QAM signal 701 from the CMTS 702, is converted to SCM by a special modulator 703, transmitted over a noisy channel 706 and reproduced by an SCM demodulator 704 at the SR. SCM is a mixed analog-digital modulation scheme as described below in which the 256QAM signal 701 is treated as an analog band-pass channel. Any noise impairments in the cable section 701 are reproduced in the received section of cable 705, thus enabling the cable modem convolutional FEC decoder to perform soft decisions based on impairments in the cable sections 701, 705 and the wireless link 706.

Figure 8:
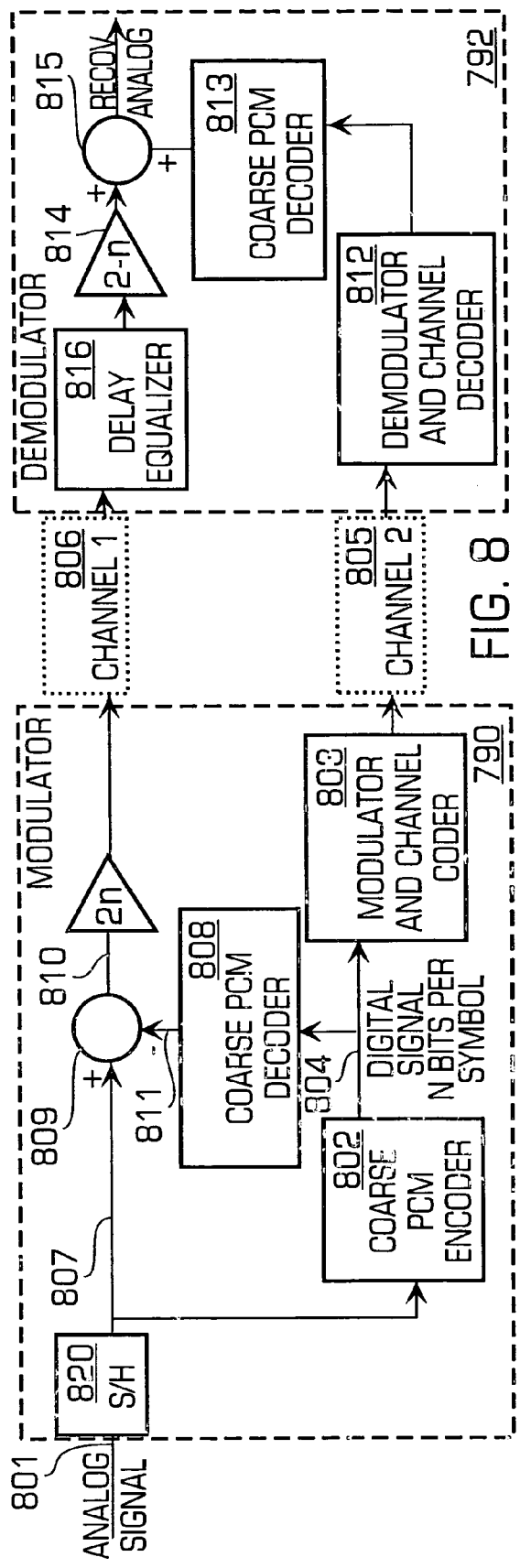
FIG. 8 is a block diagram illustrating the SCM scheme in accordance with the invention in a single dimension.

A general block diagram illustrating an example of the principles of SCM operation is shown in FIG. 8. An SCM modulator 790 accepts an analog signal 801. This signal can be any band-limited stochastic process, such as a gaussian random source or a modulated 256QAM signal that resembles band-limited white noise after modulation. After sampling (using a well known sample and hold (S/H) 820) that creates a time discrete analog signal 807, the samples are PCM encoded by a coarse encoder 802 that may be a few-bits A/D converter. These bits from the encoder are sent to a digital modulator and channel encoder (FEC) 803. For example, it is known that QAM modulation and advanced error correction techniques can transmit these N bits per symbol 804 error free at a rate very close to the channel capacity for various channel models, including an additive white gaussian channel. While the coarse digitized signal may be transmitted over a channel called "channel 2" 805, another channel 806 may transmit an analog signal that is generated by subtracting the analog signal 811 created from the coarse digital sample 804 from the original time-discrete signal 807 using a PCM decoder 808 and a subtractor 809. The difference 810 at the output of the subtractor 809 is amplified by a predetermined gain, such as $2^N$ in this example, to stretch the analog signal to make it more noise resistant as described in more detail below. This analog signal is transmitted via a channel called "channel 1" 806, using amplitude modulation suitable for that channel. In the simple case where the channel 806 is additive with white gaussian noise, the only modulation step required is a linear filter $h1(t)$ similar to the filter 307 in FIG. 3. Thus, SCM in accordance with the invention is accomplished by splitting information into two channels. Channel 1 806 transmits analog symbols, representing an amplified version of the difference between the original signal samples and the analog value of the coarse digital representation of the signals, while channel 2 805 transmits the coarse digital representation of these signals, properly encoded for that channel. A more general explanation of the information transmitted in each channel in accordance with the invention is as follows. Channel 1 806 transmits an analog symbol representing a stretched segment of the signal dynamic range, which is that segment that contains the current sample amplitude. Channel 2 805 contains information about which segment was transmitted. An example of this is described below with reference to FIG. 12.

An SCM receiver 792 retrieves the digital signal on Channel 2 805 using a digital receiver with a channel demodulator/decoder 812 that matches the channel encoder 803 and the digital information is converted to analog using a coarse PCM decoder 813 identical to the PCM decoder 808. The analog signal on Channel 1 806 goes through a delay equalizer 816 and is attenuated by a predetermined factor, such as $2^N$ in the example that matches the gain in the modulator 790 (i.e. a gain of $2^{-N}$) by an attenuator 814, and added to the coarse analog signal using an adder 815. The delay equalizer 816 compensates for the difference in channel and processing delays in both channels (i.e., the digital signals take longer to process since it must be decoded).

The SCM robustness increase that permits transmission of a signal over a noisy channel happens in both channels. In channel 1, the analog signal is amplified or "stretched" by a predetermined amplitude factor, such as $2^N$, and will be "compressed" by the same factor in the receiver so that channel noise will be compressed by the same factor. Thus, channel noise will affect the analog signal less since the, when the analog signal is compressed at the receiver, the noise is also compressed so that it will have less effect on the analog signal. The digital channel uses robust modulation and error correction that in an ideal system is error-free. In the ideal case, the entire SCM process throughput is a linear, additive transmission of analog signals so that it is fully transparent to the signal formats as long as the signal remains band limited.

Figure 9:
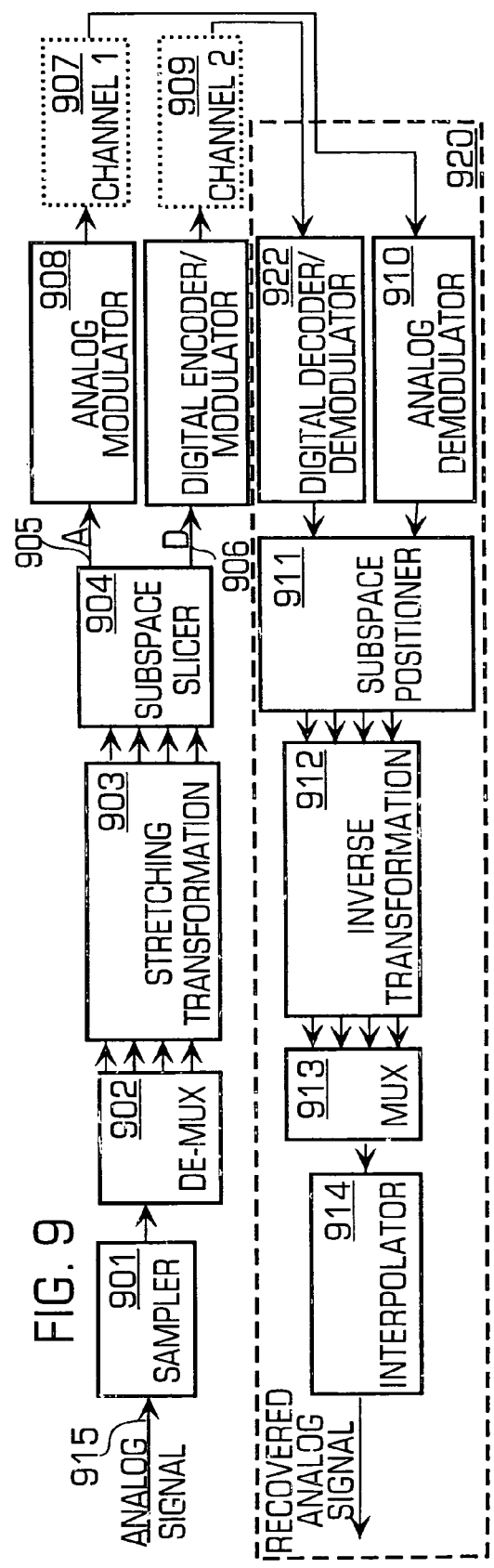
FIG. 9 is a block diagram illustrating the SCM scheme in accordance with the invention in multiple dimensions.

A more general description of SCM in accordance with the invention is discussed in conjunction with FIG. 9. In particular, signal samples by a sampler 901 are arranged as groups of M samples representing a point in an M-dimensional space by a demultiplexer 902. The M-dimensional vector value X is transformed to another M-dimensional vector Y using a transformation Y=f(X). This transformation, f, can be described as a mathematical operation or a look-up table and is preformed by a stretching transformation 903. The transformation 903 may include stretching in the M dimensions. A simple and preferred transformation may be the linear stretching by a scalar factor k (e.g., in vector notation, it is Y=kX). The transformed space is then sliced into sub spaces by a subspace slicer 904. The slicer also chooses the subspace containing the point Y and outputs the analog symbols "A" 905 containing the coordinates of the chosen subspace. The slicer 904 also outputs the digital symbols "D" 906 containing the information as to which subspace was selected. The stream of symbols "A" is modulated by a modulator 908 for transmission over an analog channel with modulation proper for that channel 907. For channels with additive white gaussian noise, pulse-amplitude modulation (PAM), or its two dimensional version, analog quadrature amplitude modulation QAM are preferred. The digital symbols are encoded and modulated for the particular channel 909 using well known digital coding and transmission techniques, including source compression, channel coding, scrambling and modulation.

A receiver side 920 of the SCM signals is the reverse operation of the transmit side, including analog demodulation 910, digital demodulation and decoding 922, coordinating the association of recovered "A" and "D" symbols and rebuilding the vector "Y" by a positioner 911, performing inverse transformation, serializing the recovered vector X by a multiplexer 913 and recovering the analog waveform by an interpolator 914. The various operations described above can be implemented using digital signal processing techniques. In a exemplary implementation, the sampler 901 output may be converted to digital symbols with sufficient precision and the transformation and slicing are all digitally implemented. The symbols "A" and "D" are both digitally processed and delivered to the transmission sections that are also digital signal processors followed by D/A converters in a manner similar to the way existing cable modems are implemented as discussed in conjunction with FIG. 3.

Figure 10:
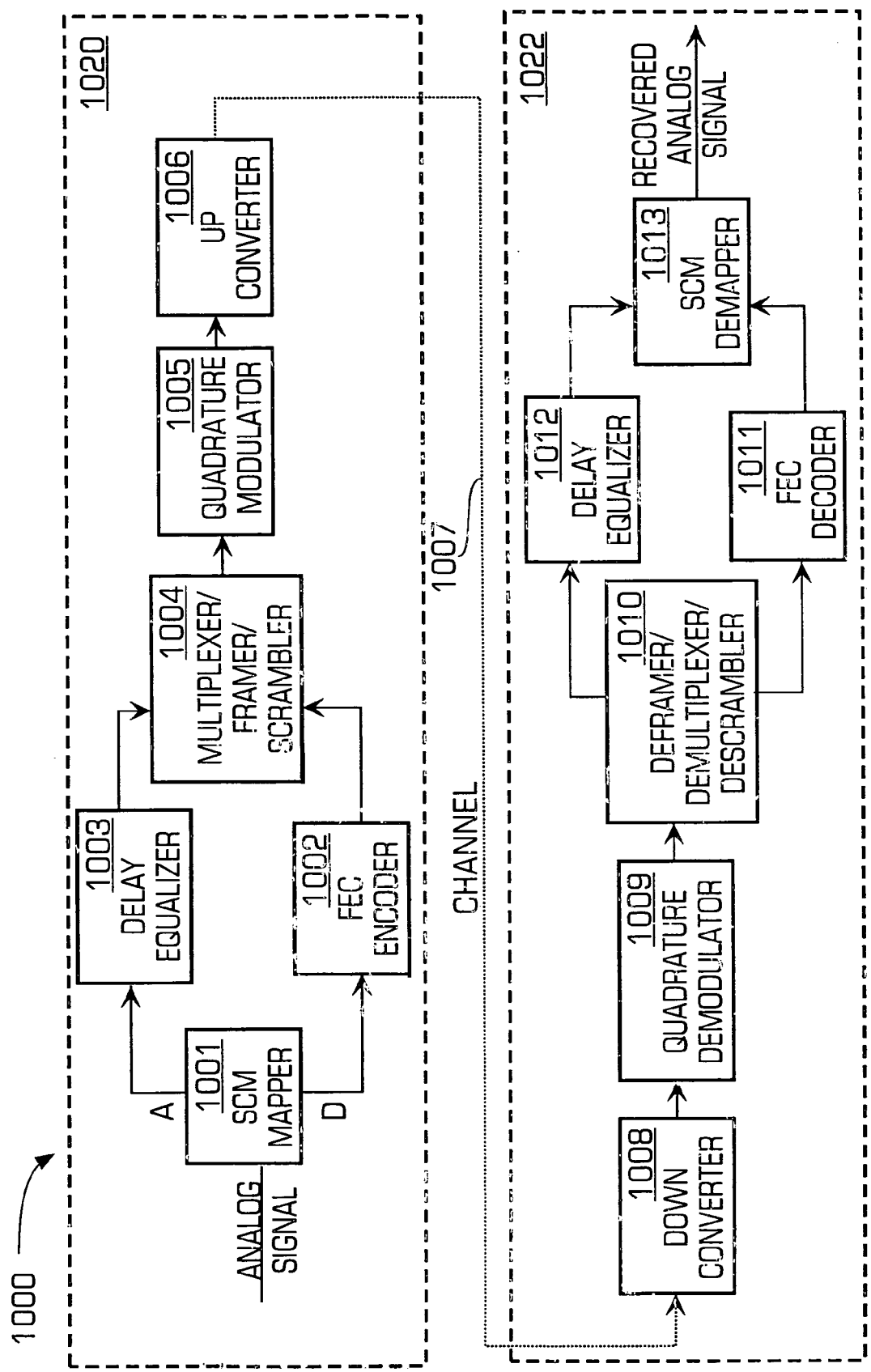
FIG. 10 shows an example of a preferred SCM scheme in accordance with the invention based on modified QAM.

A preferred embodiment of an SCM modem 1000 is shown in FIG. 10. The modem 1000 may include a transmit portion 1020 and a receiver portion 1022. In this preferred embodiment, the two channels for SCM are combined into one channel that is time division multiplexed between the digital and analog symbols. For example, if the number of "A" symbols and "D" symbols are equal, a combined channel may transmit the sequence "ADADAD"... which is referred to as an "AD" Pattern. Both of the "A" and "D" symbols are QAM modulated, using quadrature modulators like the unit 309 in FIG. 3. This preferred embodiment relies on existing QAM modems and existing forward error correction techniques to simplify implementation. The combination of the SCM functions in FIG. 9, such as the demultiplexer 902, transformer 903 and slicer 904, may be called an "SCM Mapper" 1001 as shown in FIG. 10. The output of the mapper may include "A" symbols and "D" symbols. The "D" symbols are FEC encoded 1002, and the "A" symbols are delay equalized by a buffer 1003 to compensate for the delay due to the FEC encoding and decoding. Extra digital symbols are added for frame-sync purpose, including the addition of digital control channels for CR to SR overhead communication, and scrambling. These functions are performed by a digital multiplexer 1004. Digital scrambling is well known and is not described here. Analog scrambling is accomplished by bipolar modulation of the "A" symbols based on the bit value and a pseudo-random digital sequence. The multiplexer output is driving a quadrature modulator 1005 and a radio front-end known as an up converter 1006, suitable for the channel 1007. For a radio channel, the up converter 1006 includes an antenna and tuning circuit as discussed in conjunction with FIGS. 4 and 5. The receiver side 1022 of the SCM modulator is the reverse of the modulation process, comprising a down converter 1008, quadrature demodulator 1009, including carrier recovery circuit as in any QAM demodulator, deframer-descrambler 1010, FED decoder for the "D" symbols 1011, delay equalizer for the "A" symbols 1012 and SCM demapper 1013, which includes the corresponding inverse functions of the SCM mapper 1001.

Figure 11:
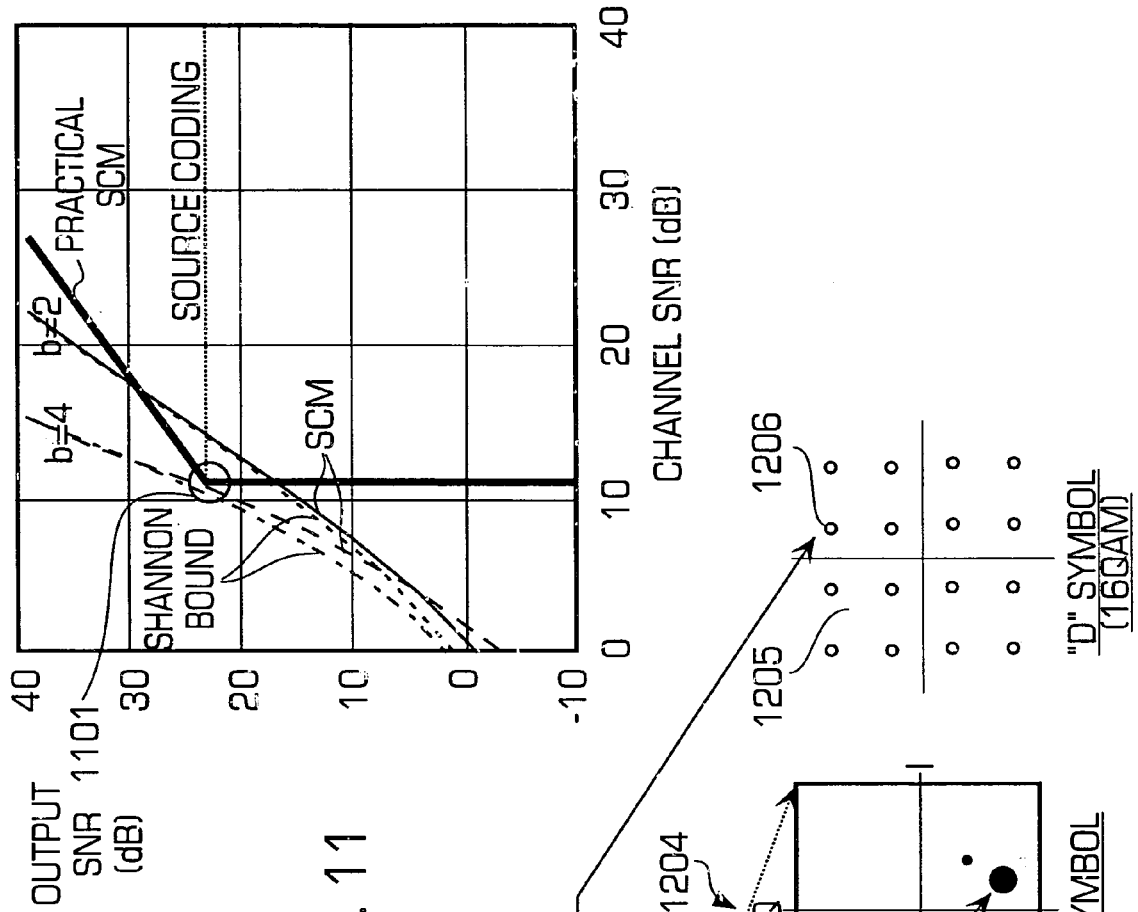
FIG. 11 shows the theoretical performance of the SCM scheme compared to the Shannon Bound for SNR improvement in a Gaussian channel with bandwidth increase factor "b" equal to 2 and 4.

The theoretical performance of the SCM method in accordance with the invention is shown in FIG. 11. For determining the theoretical performance, a white gaussian channel and a linear transmitter using linear signal stretching are assumed. It is known from information theory that the Shannon bound for signal to noise ratio (SNR) improvement in a gaussian channel with bandwidth expansion factor "b" is:

$$SNRd = \left(1 + \frac{SNRc}{b}\right)^b - 1$$

where SNRd is the output ("destination") SNR and SNRc is the channel SNR. It is further known that the capacity, in bits/sec, of a digital channel using gaussian channel with bandwidth B is:

$$C = B \cdot \log_2(1 + SNRc)$$

Now, if the original analog signal (such as signal 915 in FIG. 9) uses bandwidth B, the expanded channel uses bandwidth bB. In the SCM output, the "A" symbols occupy bandwidth B and the remaining bandwidth for "D" symbols is (b−1)B. If all "A" and "D" symbols share the same fraction of the available power, each has only 1/b of the original power if the analog symbols 915 were transmitted directly over the channel. This 1/b sharing of the available power is not optimum but is simple for analysis. Using these assumptions, the SNR performance of SCM with the "D" symbols achieving channel capacity can be derived from the above equations. The result is:

$$C = (b-1) \cdot B \cdot \log_2\left(1 + \frac{SNRc}{b}\right) \quad \text{(Eq. 3)}$$

These bits are used for qualifying the analog symbols in the analog portion. As there are 2B symbols/sec and C bits/sec, there are M=C/2B bits per analog symbol. Now, the analog signal in the range [−a,a] is not transmitted in full. Instead, it is amplified by a factor $2^M$.

The signal to noise increase is the square of the magnification, thus it equals $2^{2M} = 2^{C/B}$. Therefore:

$$SNRd = \frac{SNRc}{b} \cdot 2^{\frac{C}{B}} \quad \text{(Eq. 4)}$$

Substituting Eq. 3 for C in Eq. 4:

$$SNRd = \frac{SNRc}{b} \cdot 2^{(b-1) \cdot B \cdot \log_2\left(1 + \frac{SNRc}{b}\right)} \quad \text{(Eq. 5)}$$

And simplifying:

$$SNRd = \frac{SNRc}{b} \cdot \left(1 + \frac{SNRc}{b}\right)^{b-1} \quad \text{(Eq. 6)}$$

This result is graphically shown in FIG. 11 compared with the Shannon bound for values of b=2 and 4. Since, in the cable modem applications, the "analog" signal is carrying 64QAM or 256QAM signals, the useful output SNR for SCM is above 30 dB. At this high output level, it is evident from the graphs that SCM is close to the Shannon bound within fractions of 1 dB. Thus SCM is essentially an ideal modulation scheme. The practical implementation of SCM will introduce some deficiencies to this ideal model. The most obvious one is that the "D" symbols undergo coding of practical complexity, thus the "D" symbols do not meet the channel capacity. Another limitation is scale related. The use of QAM for the "D" symbols is optimal only in one point of channel SNR, thus SCM will follow the curve "Practical SCM" in FIG. 11, which is close to the Shannon bound only in one point. This practical SCM is still advantageous over the PCM "source coding", all-digital alternative shown in a dotted line in FIG. 11. While at the threshold corner point 1101, both techniques are equal, as channel SNR increases, the SCM SNR improves, thus giving higher error margins for the carried payload.

Figure 12:
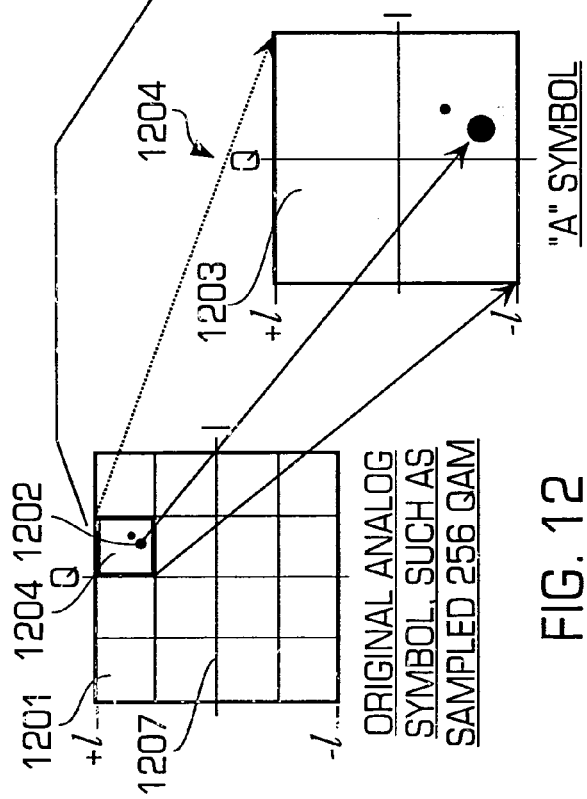
FIG. 12 is a diagram illustrating an example of the SCM mapping of an analog (I,Q) sample of the input signal onto two SCM symbols, an "A" symbol and a 16QAM "D" symbol in accordance with the invention.

In the preferred embodiment shown in FIG. 10, quadrature amplitude modulation (QAM) may be used. This scheme is conveniently implemented as a two-dimensional SCM, a special case of the operations discussed in conjunction with FIG. 9. The input analog signals are sampled at the output of a synchronous quadrature receiver similar to the cable modem points 319 and 326 in FIG. 3. The processing of these signals is illustrated in FIG. 12. The input sampling space is a space where I and Q is a gray area 1201 of amplitude −1 to +1. The vector (I,Q) is a point 1202 in the input space in a subspace 1204. If the entire region 1201 is enlarged linearly by a factor of 4, then the slice 1204 containing the vector 1202 is selected as the "A" symbol 1203. The decision to transmit the subspace 1204 as an "A" symbol 1203, is defined by a 16QAM "D" symbol. A constellation point 1206 for the "D" symbol was made so that the point 1206 has the same orientation as the original slice 1204. This correspondence makes the "D" and "A" symbols rotation invariant so that if an SCM demodulator errs in rotation, the recovered "A" symbols will remain consistent, and the end-user 256QAM channel may still operate correctly. A state of the art QAM modems can easily synchronize based on framing 1004 discussed in conjunction with FIG. 10. The example of FIG. 12 creates a pattern of "AD" symbols in which "A" is the analog QAM and "D" is 16QAM. Many other patterns can be created to suit each application.

The general guideline is to maintain a near balance between the SNR gain of the "A" and "D" symbols. The example in FIG. 12 is nearly balanced, because the "A" symbols gain of 12 dB by the factor of 4 expansion, less 3 dB for the bandwidth doubling, thus has a 9 dB net gain. The "D" symbols have also approximately 9 to 10 dB gain, based on the SNR gain between 256QAM and 16QAM, thus the "AD" mode of FIG. 12 is suitable for transmitting a 256QAM signal over a channel that tolerates 16QAM performance, both for the "D" and the "A" symbols. The "D" symbols are FEC encoded so that the actual link bandwidth is not doubled, but rather slightly higher, e.g. by 20% overhead for FEC, framing, oversampling and control channel. A 6 MHz cable modem channel with 256QAM modulation will occupy about 15 MHz instead of 12 MHz in this "AD" mode. Other modes of near balance include "ADDD" where "D" is 4QAM, "ADD", where "D" is 4QAM. For bandwidth constrained application, one may use "AAD" where "D" is 16QAM, and each "A" symbol is allocated two bits of that "D" symbol and each dimension of the "A" symbols has 6 dB SNR gain less 10 Log(1.5) for the bandwidth expansion.

For the analog signal portion of the SCM method, the analog signal are made more noise resistant by the stretching of the analog signal space as described above. In particular, during the transmission process, the analog signal space is stretched. Any channel noise that is introduced into the transmitted signal affects the stretched analog signal. During the reception of the analog signal, the analog signal is compressed any noise from the channel is also compressed. Thus, when the analog signal is compressed, the noise from the channel is also compressed so that the effect of the noise on the analog signal is reduced. This compression of the channel noise reduces the sensitivity of the analog signal to noise.

Figure 13:
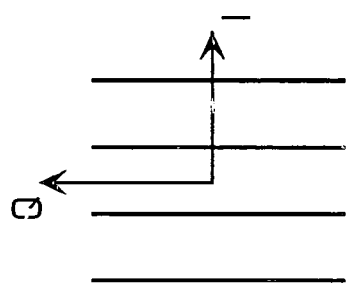
FIG. 13 shows a diagram illustrating an example of an SCM symbol constellation in accordance with the invention with mixed analog and digital variables.

Another preferred embodiment of SCM includes mixed analog-digital symbols, as shown in FIG. 13. In particular, the Q-coordinate represents a one-dimensional "A" symbol, while the I-coordinate represents a "D" symbol, carrying 2 bits of information. Such mapping is useful when no FEC is added to the "D" symbols. Each symbol is independently processed and the "A" gain of 9 dB is maintained like the "AD" case above, as long as the errors the "D" channel are small. Other combinations of analog-digital symbols are possible, in which the analog portions are represented by continuous domains, such as line segments or squares, and the digital portion is represented by gaps between the analog domains. In the following implementation description, the preferred symbol arrangement is separate "A" and "D" symbols, because the separation allows the "D" subsection to be implemented using conventional QAM modems.

Figure 14:
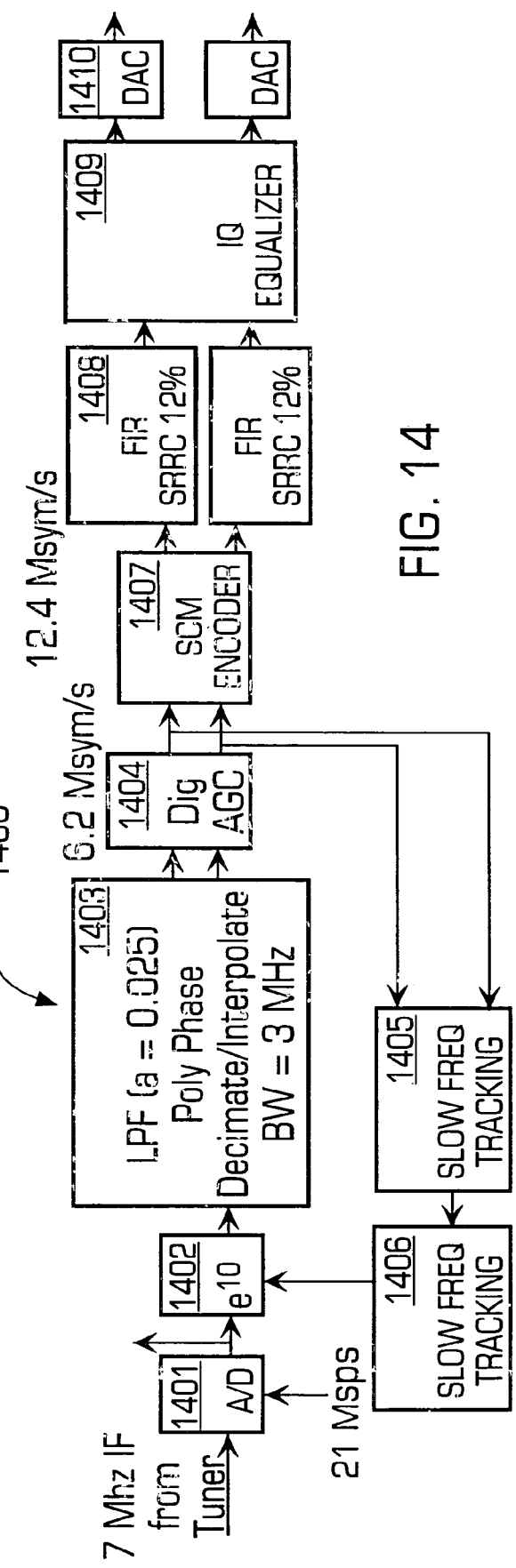
FIG. 14 is block diagram illustrating an example of a digital implementation of the transmit side of an SCM transceiver in accordance with the invention.

FIG. 14 illustrates an example of an implementation of an SCM modulator 1400 in accordance with the invention for a 6 MHz-channel cable modem using an integrated circuit, which is a modified cable modem IC. A cable modem downstream channel from the cable is selected and, after anti-aliasing filtering, is digitized by an A/D converter 1401. Like other digital modems, the bandpass signal is de-rotated by a de-rotator 1402 to obtain baseband I and Q samples. These samples are decimated and filtered using a polyphase-filter/decimator/interpolator 1403 to provide I and Q samples at approximately 6.2 Msym/sec. A digital AGC 1404 feeds a slow-frequency tracker 1405 and a digital oscillator 1406, which ensures that the received 256QAM constellation is not rotating. The constellation thus could fit the square region 1201 in FIG. 12. This de-rotation is not necessary, because at a small sacrifice of dynamic range, without de-rotation the square input constellation will appear slowly rotating, thus describing a circle in the I,Q plane. However, such a circle could still be enclosed inside the grid 1207 of FIG. 12, and transmitted correctly. The end-user's cable demodulator will de-rotate such signal. This is one advantage of the SCM transparency in that no de-rotation is necessary. Furthermore, if the input signal is truly analog, such as a cable TV channel carrying analog broadcast signals, there is no "rotation" of a constellation in this case, but the SCM will still modulate this signal correctly and provide the SNR gain for "A" symbols.

The I and Q samples are SCM encoded by a SCM encoder 1407, performing the SCM Mapper functions as described above, and delivered to the link fractional matched filers 1408, implemented as FIR structures with frequency response described by root-raised-cosine function with 12% roll-off. The encoder also performs I,Q gain and phase compensation 1409 that is useful for correcting imperfections in an external analog quadrature modulator similar to the structure 309 in FIG. 3. Other functions, such as pre-distortion compensations for the radio power amplifier can be added in series with the I,Q equalizer 1409. The digital samples are then converted to analog 1410 and after using external analog anti-alias filers, these I and Q channels can drive a quadrature modulator and follow a conventional transmitter chain.

Figure 15:
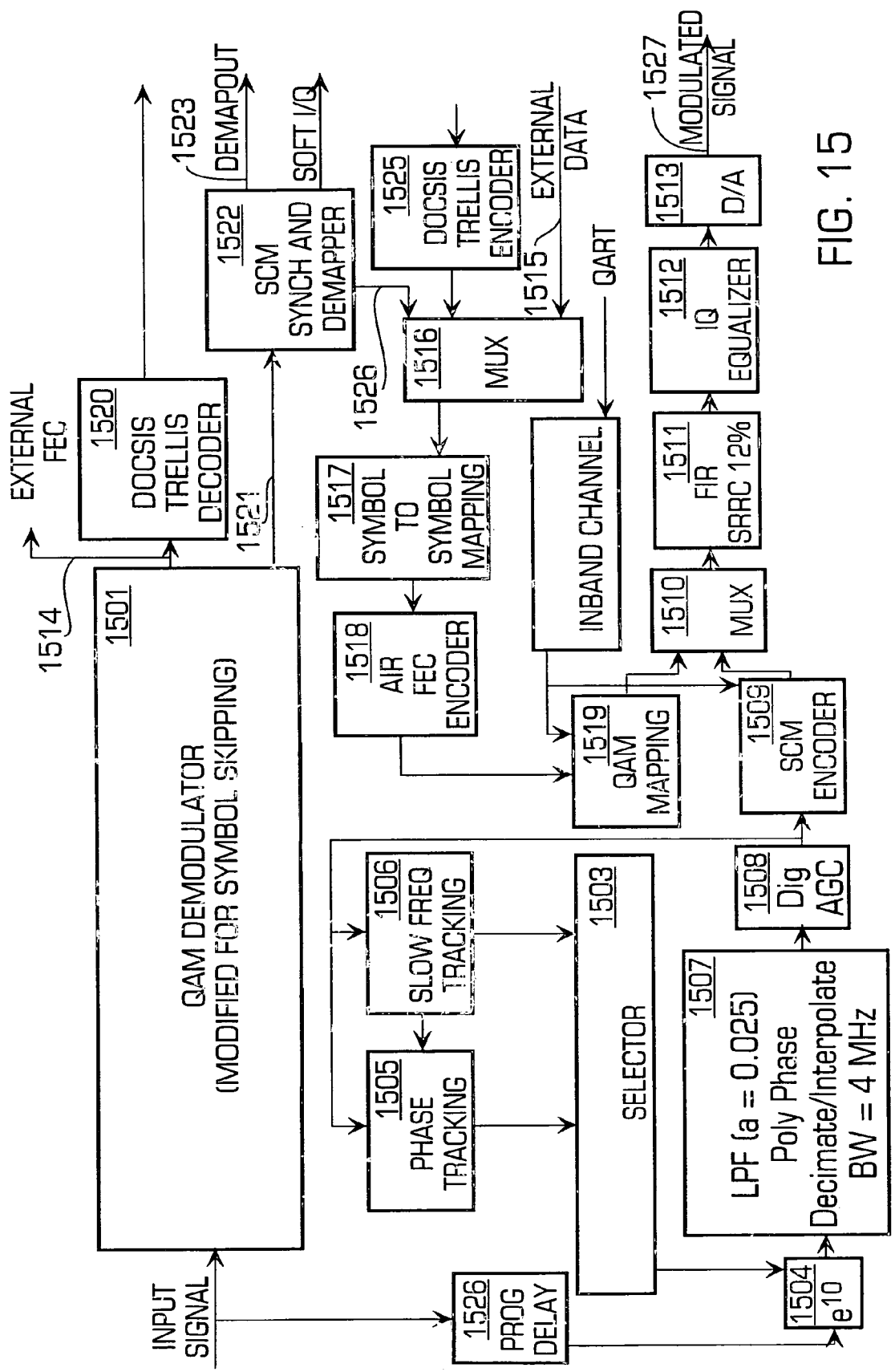
FIG. 15 is a diagram illustrating an example of a detailed implementation of an SCM transceiver (transmit or receive sides) based on a modified QAM digital IC.

A transmit-receive SCM IC is shown in FIG. 15. This IC can perform both SCM modem functions, as well as conventional digital QAM with a demod-remod mode. The operation of this IC is first described in the SCM transmission mode. The input signal, which contains a downstream cable modem channel, enters a QAM demodulator 1501. This demodulator is used, in the case of SCM, to track the input carrier phase and provide a signal that, if selected by a selector 1503, will de-rotate the constellation for the SCM operation using a de-rotator 1504. Other configurable tracking options are provided using a phase tracking or slow frequency tracking 1506, depending on the application. The SCM modulator building blocks 1507, 1508 and 1509 have been described in conjunction with FIG. 14 (See 1403, 1404 and 1407 which will not be described here).

In SCM mode, the multiplexer 1510 selects the SCM signal that is fed to the filter 1511, followed by I,Q equalizer 1512 and D/A converter 1513 as discussed above. The modulated signal 1527 is then either two separate analog lines representing I and Q signals, to be followed by a low pass filter and an analog quadrature modulator, or a single line including an already quadrature modulated signal that has been modulated in the digital domain. As both techniques are well known, the preferred embodiment includes both output modes in the integrated circuits, allowing the same IC to be used in different analog IF configurations. If a demod-remod operation is preferred instead of SCM, the demodulator section of the modem 1501 is used for demodulating the 256QAM cable modem signal and the digital output 1514 is processed via several options. One option ("Option 1") is to take the decoded signal 1514 and feed it directly to the external data port 1515, where this signal is selected by a multiplexer 1516, symbol-mapped for trellis encoding consistency by a symbol mapper 1517, FEC encoded 1518 for the air-transmission (using trellis code not necessarily identical to the cable modem trellis code) and mapped to the QAM constellation 1519 using a QAM mapper. The symbol mapper 1517 is a demultiplexer structure for converting n-bit symbols to m-bit symbols for the various operating modes. For cost saving, the air FEC encoder 1518 may be identical to the FEC encoder used for SCM in the block 1509 or block 1011 in FIG. 10. The rest of the translation path is identical to the SCM mode discussed above. Since this mode is increasing bandwidth by the air-FEC encoder 1518, another option is provided (Option 2), in which the demodulated signal 1514 is first trellis decoded 1520, thus bit rate is reduced and bit errors in the cable are corrected before transmission. The decoded signal can then be fed the external data port 1515 for air-transmission.

The same IC in FIG. 15 can also be used as an SCM receiver. The QAM modem 1501 is modified for SCM reception. The key change is in the symbol rate synchronization (clock recovery) circuit. A conventional QAM demodulator expects a known discrete constellation to synchronize. Since the "A" symbols do not contain such constellation, the clock recovery circuit may not converge. The modification is the addition of a state machine that performs the following algorithm. For a given pattern such as "ADD", halt clock recovery error measurement operation every third symbol, which is the "A" symbol. Initially, the recovery circuit does not know which three options is the one with "A" symbols, thus it tries three hypotheses in succession until synchronization is achieved. The modem is also modified not to slice the "A" symbols as data but to output them transparently to a SCM bus 1521. Another modification is required if the QAM demodulator is required to perform adaptive equalization of multipath reception. Digital modems use a combination of feed-forward (FF) equalizer stages and decision feedback (DF). DF is preferred because it uses less hardware, and FF is normally used only for the non-causal fraction of the equalization process. Since there is no "decision" in "A" symbol reception, yet the equalizer must equalize both "A" and "D" symbols which are interleaved, an all-FF equalizer may be used.

In the SCM receive mode, the recovered "A" symbols 1521 are demodulated by the block SCM sync and demapper 1522, which includes the combined functions shown in FIG. 10 of deframer/descrambler 1010, delay equalizer 1012, FEC decoder 1011 and SCM demapper 1013. The recovered analog signal is available at an output 1523 for conventional processing by a cable modem tuner like the tuner 405 in FIG. 4.

In the non-SCM mode, the QAM demodulator 1501 is operating in the air interface mode such as 4QAM or 16QAM, The recovered signal 1514 is FEC decoded for the air-FEC mode. If air-FEC trellis encoding 1518 was used in addition to the cable trellis overhead in the transmit side (option 1 above), an FEC decoder is provided inside the SCM demapper 1522, bypassing the SCM mode, and using the bus 1521 to pass the digital signals form the demodulator 1501 to the FEC decoder inside the SCM demapper 1522. The air-FEC decoded signal is passed to the multiplexer 1516 via a bus 1526, following by the symbol mapping 1517, bypassing air FEC encoding 1518 and performing cable modem QAM mapping 1509 such as 256QAM, and the rest of the transmit chain 1510, 1511, 1512, 1513. If trellis decoding overhead was eliminated in the transmitter, (Option 2 above), the decoded signal is re-encoded using a DOCSIS trellis encoder 1525, following by same path is Option 1. A programmable delay 1526 equalizes the signal path timing with the demodulator 1501 timing of the synchronization signal 1502. All of the functions described in conjunction with FIG. 15 can be implemented on a single IC and are comparable in complexity to physical-layer cable modem ICs.

Figure 16:
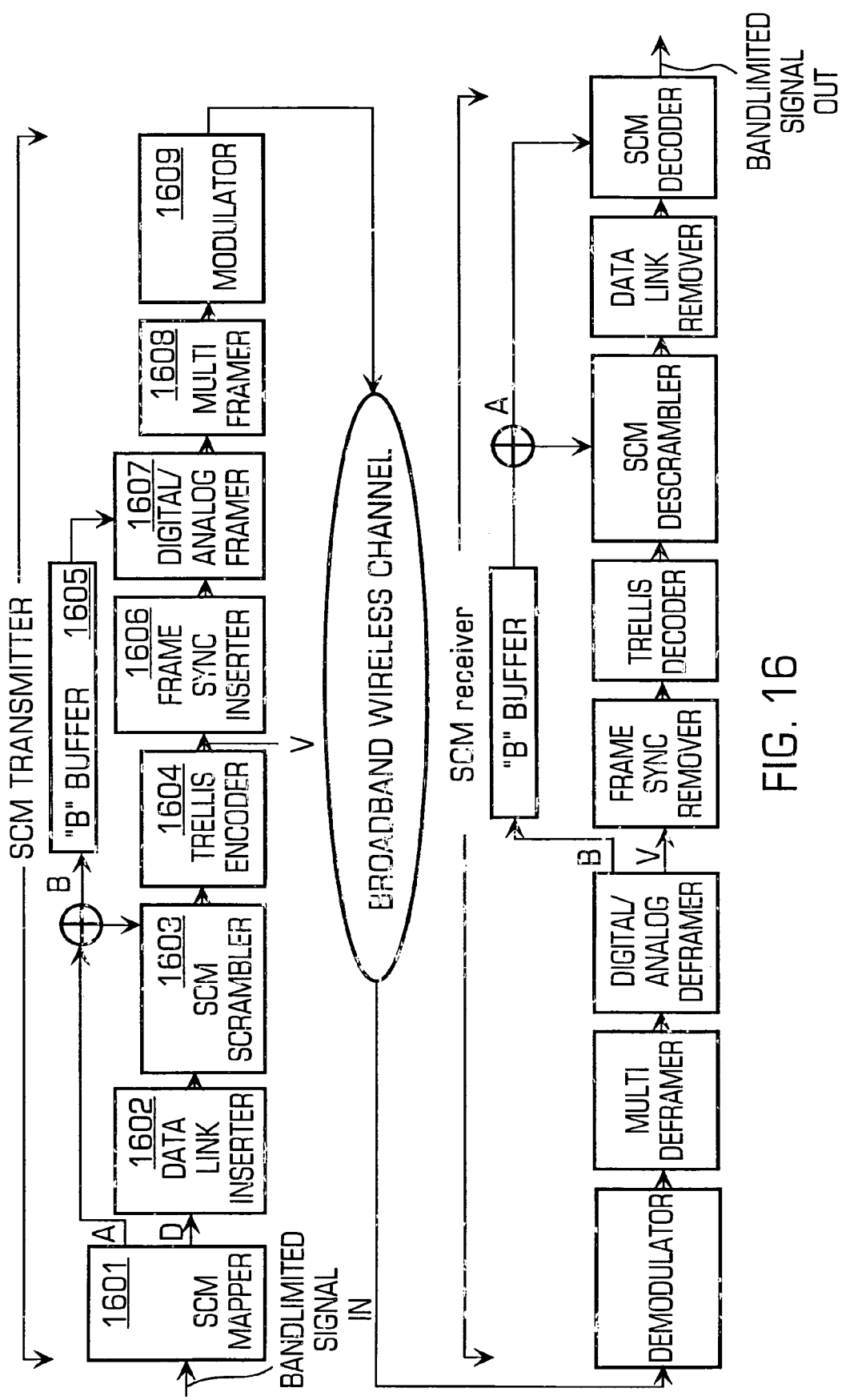
FIG. 16 is a block diagram of the framing structure in accordance with the invention for mixed analog and digital symbols.

The signal framing, as performed inside the SCM Encoder 1509 is shown in more detail in FIG. 16. The "A" and "D" symbols from the SCM Mapper 1601 are split to two paths. The "D" symbols are multiplexed with a data link overhead by a Data Link Inserter 1602, the aggregate bitstream is scrambled by the SCM scrambler 1603, which is a conventional bit-wise exclusive OR operation with a pseudo random sequence. A similar sequence is used for scrambling the "A" symbols using bi-phase modulation. The scrambled "A" symbols are called "B" symbols. The scrambled digital stream is trellis encoded by an encoder 1604, whose output symbols are denoted "V", frame synchronization sequence is added 1606 in the form of a few fixed symbol values, and a Framer device 1607 multiplexes the analog and digital streams, after delay-equalizing the "B" symbols using a buffer 1605. A multiframe structure is added by inverting every $n^{th}$ frame sequence (See 1608). A multiframe structure allows use of a long scrambling sequence of about 10,000 symbols to improve the random-like properties of that sequence. The multiframed aggregate signals I and Q streams then follow other modulation steps collectively referred as "modulator" 1609 and are related to the FIR filter 1511 in FIG. 15, quadrature modulation and up-conversion. The receive side of this framing operation is the inverse of the framing operation and is shown at the bottom half of FIG. 16. If a demod-remod mode is in use, the same framing structure is used, skipping the "A" symbols. Such frame structure is included in the QAM mapping function 1519 in FIG. 15.

The distribution of "B" symbols among the digital symbols (framing or "V" symbols) in the frame for SCM is arranged so that the number of digital symbols, modulo an integer number M, between "B" symbols is always the same. For example, For the symbols sequence originated from SCM mapping as "ADD", which is converted to a frame of symbols "B" and "H", wherein "H" represents any digital symbol, including overhead, the integer base 3 chosen, thus the frame structure may include the subsequences [BHH], [BHH,HHH] [BHH, HHH,HHH], all containing 2 "H" symbols modulo 3 but not [BH] or [BHHHH]. This modulo rule enables easy symbol timing synchronization in the demodulator 1501. The demodulator can use a conventional QAM synchronization circuit, based on the constellation structure of the "H" symbols, and skip every M symbols (containing the "B" symbols). Initially, the demodulator tries three hypotheses is to which third symbol should be skipped. If synchronization is achieved, the periodic location of "B" symbols is accomplished.

Figure 17:
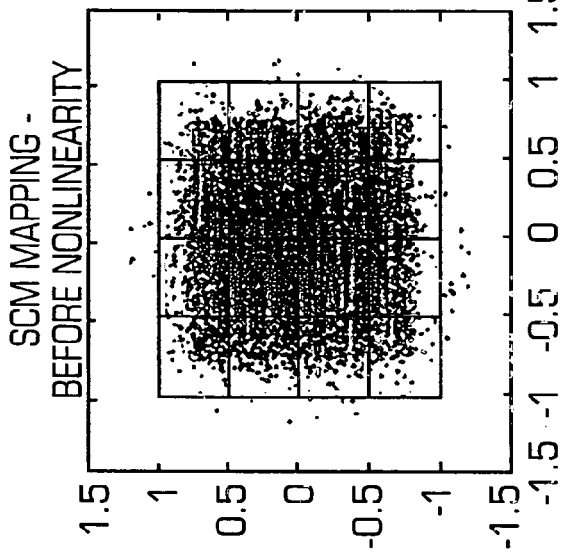
FIG. 17 shows a simulated collection of I and Q signal points of 256QAM modulated signal after a Root-Raised Cosine filter and sampling, superimposed over an SCM mapping grid.

In the transmission of SCM, it is important to map the input signal dynamic range to the "A" symbols to maintain good channel efficiency. A simulated sample space of a 256QAM cable modem constellation is shown in FIG. 17. The sample points do not all fit in a square grid because the sampling point at the Central Radio represents signals after the root-raised cosine filters 314 and 315 in FIG. 3, thus the filters cause peaking beyond the constellation boundary. These exceptions must be SCM encoded too. An obvious way to accommodate them is to increase the size of the 4×4 grid to cover all exceptions. In a preferred embodiment, the grid amplitude is adjusted, as shown in FIG. 17, and the exceptions are encoded as exceeded values of the nearest subspace, i.e. the perimeter of the grid is treated as "open" and each outside point is encoded based on its distance to the center of the nearest closed subspace center. This exception handling was found to be more channel-efficient in simulation than an enlarged grid. By maintaining the grid size adjustable, the optimum size can be determined experimentally as a compromise between cable modem link BER floor caused by exceptions vs. link margins reductions caused by larger grid. In a practical system, non-linearity of the RF power amplifier and the response of the pulse filters 1511, play a role in the chosen optimum operating point.

This exception handling capability plays a role in choosing the number of dimensions in SCM encoding. As discussed above in conjunction with FIG. 9, the stretching transformation can be done in multiple dimensions. While the preferred embodiment used two dimensions, other mappings could be optimized for each application. In the two dimensional grid of FIG. 16, there are four inside squares and 12 outside squares. If two consecutive (I,Q) pairs were aggregated to a four-dimensional structure. The SCM sample space will have a hyper-cube of four dimensions representing $4^4=256$ subspaces with 16 internal subspaces and 240 subspaces with outside boundaries. This suggests that a four-dimensional structure will have a different ratio of outside to inside subspaces, i.e. 240/16=15 compared with 3 in the two dimensional case. Therefore the four dimensional transformation, even if it remains linear like the two dimensional, the performance may vary to the advantage of four dimensions.

For similar reasons, it is sometimes preferred to use a different mapping than the linearly stretched two dimensional space. To accommodate a circular input domain, it is possible to map a quarter circle to a circle using a non-linear, but essentially reversible transformation, such as conformal mapping. For the "AD" case where "D" is 16QAM, applying a quarter circle-to-circle transformation twice in succession by first dividing a circle to four quadrant using two perpendicular diameters, recording which quadrant contains the signal, mapping the quadrant to a complete circle using conformal mapping and repeating this process will create four bits for the "D" symbol and an approximately 4 times enlargement for the "A" symbols, although this enlargement is not uniform.

An example of conformal mapping of a quarter circle to a circle is as follows. A mixed analog-digital modulation includes another degree of freedom in relative gain applied to the analog symbols and digital symbols. Affected mostly by system non-linearity such as saturation of the power amplifier, a slight imbalance of the gain in each channel may lead to optimum results in the overall performance of SCM. In a preferred embodiment, a ±6 dB adjustment range relative to the equal gain peak value of "D" and "A" symbols, with steps of 0.1 dB is used.

The ability of the input dynamic range to handle exceptions allows efficient processing of rotating constellations or even random noise where the sample space is essentially circular. Another embodiment of a transformation in SCM mapping includes mapping a quarter circle to a circle. This mapping creates two bits, specifying which quarter has been selected. To map a quarter-circle to a circle it is possible to do so by conformal mapping. The following description of a conformal mapping is using MATLAB notation for the transformation.

1. Transforming from quarter circle to unit circle function [X]=transform(x)

$W=((1+x.^2)./(1-x.^2)).^2;$ $Y=(W-C)./(W-conj(C));$ $X=exp(j.*f(Y)).*Y$ where C is a complex constant with positive imaginary part (i.e. C is in the upper half plane), and f(Y) is any real valued function.

2. The following transformation maps the unit circle into itself $Z=(z-z0)/(1-z*conj(z0))$ for z0 being any point inside the unit circle.

Thus, one can follow the first transformation with any number of the second transformations, to get different quarter-circle to unit circle transformations. Example setting is C=j, and f(Y)=−pi/4, and the second transformation is skipped. This conformal mapping transformation has an average amplitude gain of approximately 2. If a higher gain is needed, the transformation can be applied several times, in each step a quarter circle is chosen from the circle in the previous stem and two bits of digital information are generated. The receiver performs an inverse transformation of the above.

Figure 18:
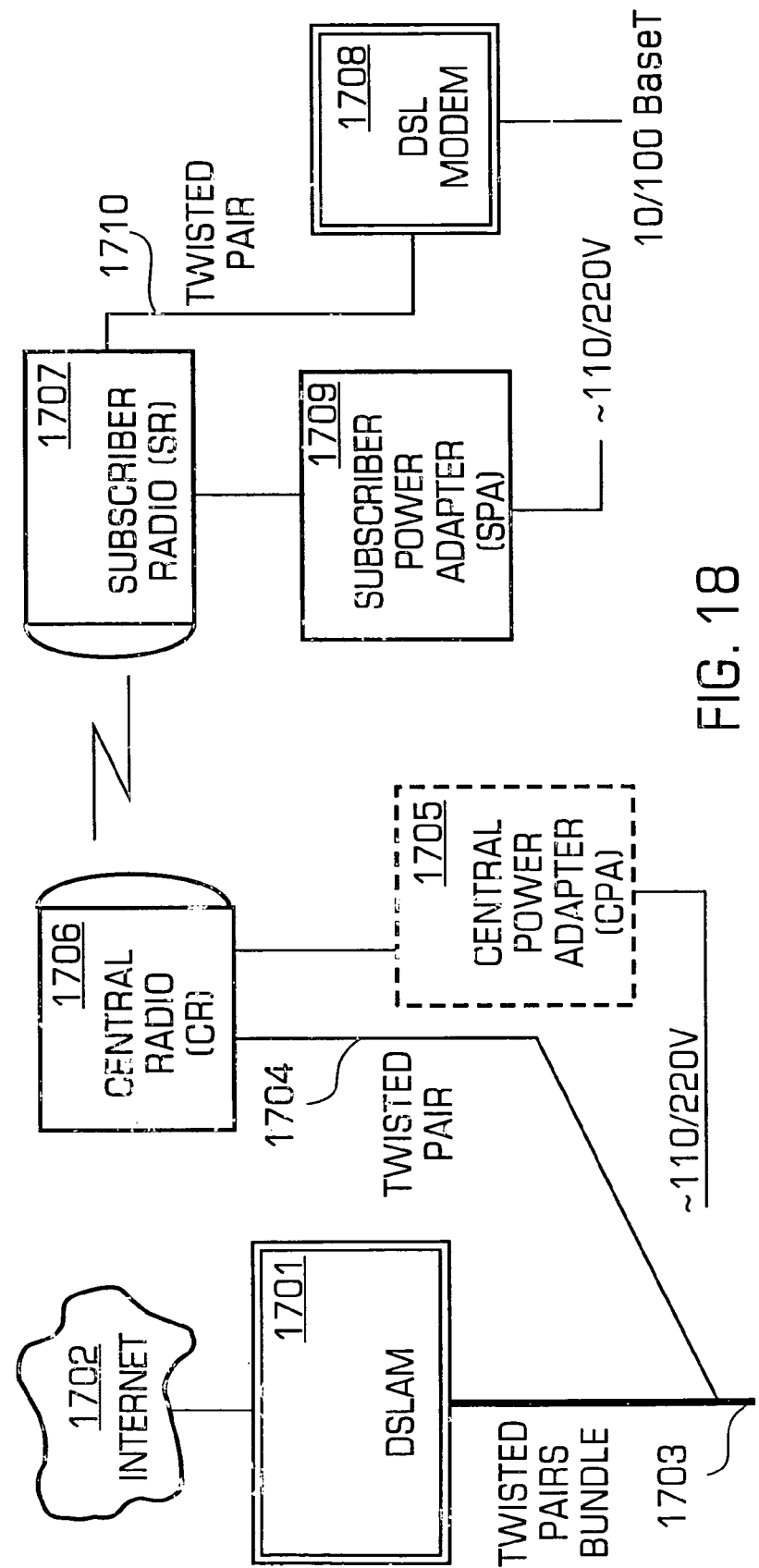
FIG. 18 shows an example of the building blocks of a wireless system in accordance with the invention for communicating a signal over a noisy wireless channel in a DSL modem environment.

While the most of this disclosure was made in the context of cable modem environment, other applications are possible in accordance with this Invention. FIG. 18 shows a wireless extension of Digital Subscriber Lines (DSL). A digital Subscriber Line Access Multiplexer (DSLAM) 1701 is normally connected to multiple DSL modems 1708, using a dedicated twisted pair for 1704 and 1710 for each DSL modem. If the twisted pair run from the central office is too long to meet DSL performance, or if there is no twisted pair at the subscriber side, a wireless slink is added using a Central Radio CR 1706 and a Subscribe Radio 1707. DSL uses continuous modulation in both directions thus the signals on both sides are transmitted using a full duplex radio link. Both demod-remod and SCM options disclosed above can be used. The CR 1706 can be either point to point or a point to multipoint with dedicated bandwidth or each SR 1707 using spectrum sharing techniques such as TDM, FDM or CDMA. In a point to multipoint case, the CR 1706 interfaces with multiple twisted pairs 1704.

The SCM method cam be also used for non-wireless applications, wherever signal robustness can be improved at the expense of bandwidth. SCM can have benefits over any media such as cable, twisted pair or a magnetic tape or an optical disk.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A signal code modulator, comprising:
   an input interface for receiving one or more time-discrete samples of a signal; and
   a signal code modulation Mapper circuit that converts the aggregate of the one or more time-discrete samples to analog and digital output symbols representing a mix of analog and digital values, wherein said analog output symbols represent amplitude values of a selected subspace of a stretched transformation of said aggregated one or more time-discrete samples and said digital output symbols represent an indication of the subspace chosen in the stretched transformation.

2. The signal code modulator of claim 1, wherein said signal code modulation Mapper circuit further comprises a stretching transformation circuit for mapping the one or more of said signal samples onto a transformed signal space represented by an aggregate of one or more transformed signal samples and a subspace slicer that selects one or more subspaces from said transformed signal space and outputs said mix of analog and digital symbols based on the selected subspace and the one or more transformed signal samples.

3. The signal code modulator of claim 1 further comprising means for forward error correcting said digital output symbols before transmission.

4. The signal code modulator of claim 2, wherein said stretching transformation circuit further comprises a linear expansion circuit for linearly expanding the sample signals in one or more dimensions.

5. The signal code modulator of claim 2, wherein said stretching transformation circuit further comprises a non-linear expansion circuit that transforms a quarter-circle sub space onto a full circle transformed signal space.

6. The signal code modulator of claim 2, wherein said stretching transformation circuit further comprises conformal mapping.

7. The signal code modulator of claim 1 further comprising a multiplexer for multiplexing the analog and digital symbols for transmission over a common communications channel.

8. The signal code modulator of claim 7, further comprising a signal code modulation Mapper comprising means for pairing said multiplexed symbols and a quadrature amplitude modulator for quadrature amplitude modulating each pair of signals to generate QAM signals.

9. The signal code modulator of claim 8, wherein each of the QAM signals comprise analog symbols or digital symbols as originated from the output of said signal code modulation Mapper.

10. The signal code modulator of claim 9, wherein the QAM signals comprise a mix of both analog and digital symbols as originated from the output of said signal code modulation Mapper.

* * * * *